United States Patent
Gupta et al.

(10) Patent No.: US 11,240,107 B1
(45) Date of Patent: Feb. 1, 2022

(54) VALIDATION AND GOVERNANCE OF A CLOUD COMPUTING PLATFORM BASED DATACENTER

(71) Applicant: salesforce.com, inc., San Francisco, CA (US)

(72) Inventors: Varun Gupta, Berkeley, CA (US); Srinivas Dhruvakumar, Vancouver (CA); Abhishek B. Waichal, Fremont, CA (US); Mayakrishnan Chakkarapani, Fremont, CA (US)

(73) Assignee: salesforce.com, inc., San Francisco, CA (US)

( * ) Notice: Subject to any disclaimer, the term of this patent is extended or adjusted under 35 U.S.C. 154(b) by 0 days.

(21) Appl. No.: 17/092,012

(22) Filed: Nov. 6, 2020

(51) Int. Cl.
*H04L 12/24* (2006.01)
*G06Q 10/06* (2012.01)
*G06Q 10/10* (2012.01)
*H04L 29/08* (2006.01)

(52) U.S. Cl.
CPC ....... *H04L 41/0869* (2013.01); *G06Q 10/067* (2013.01); *G06Q 10/06315* (2013.01); *G06Q 10/103* (2013.01); *G06Q 10/105* (2013.01); *H04L 41/0686* (2013.01); *H04L 41/0806* (2013.01); *H04L 67/10* (2013.01)

(58) Field of Classification Search
CPC ............. H04L 41/0869; H04L 41/0686; H04L 41/0806; H04L 67/10; G06Q 10/06315; G06Q 10/067; G06Q 10/103; G06Q 10/105
See application file for complete search history.

(56) References Cited

U.S. PATENT DOCUMENTS

| 8,484,353 B1* | 7/2013 | Johnson | H04L 47/70 709/226 |
| 2006/0245354 A1* | 11/2006 | Gao | H04L 41/5096 370/230 |
| 2019/0327144 A1* | 10/2019 | Tembey | H04L 41/0869 |

OTHER PUBLICATIONS

Burns, E., "Why Spinnaker matters to CI/CD," Aug. 27, 2019, seven pages, [Online] [Retrieved on Jan. 19, 2021] Retrieved from the Internet <URL: https://opensource.com/article/19/8/why-spinnaker-matters-cicd>.

(Continued)

*Primary Examiner* — Esther B. Henderson
*Assistant Examiner* — Nazia Naoreen
(74) *Attorney, Agent, or Firm* — Fenwick & West LLP

(57) ABSTRACT

A system receives one or more modifications to a platform-independent declarative specification from a set of data center entity owner teams to generate a modified platform-independent declarative specification that captures various aspects for deploying a data center on a target cloud platform. The system performs end-to-end validation of the modifications in multiple phases, starting with validating the modifications based on a set of predefined rules associated with the modified platform-independent declarative specification. When all the multiple phases of validation indicate success, the system sends a notification of end-to-end validation success in association with the received changes. Each request to modify a data center entity in the platform-independent declarative specification undergoes governance checks to ensure that the approver of the request belongs to a predefined set of owners associated with the data center entity.

20 Claims, 11 Drawing Sheets

(56) References Cited

OTHER PUBLICATIONS

Mukherjee, J., "What is a continuous delivery pipeline?" Date Unknown, 14 pages, [Online] [Retrieved on Jan. 19, 2021] Retrieved from the Internet <URL: https://www.atlassian.com/continuous-delivery/pipeline>.

Thakur, V., "Continuous Delivery Pipeline for Kubernetes Using Spinnaker," May 27, 2020, 21 pages, [Online] [Retrieved on Jan. 19, 2021] Retrieved from the Internet <URL: https://www.metricfire.com/blog/continuous-delivery-pipeline-for-kubernetes-using-spinnaker/?GAID=undefined&GAID=undefined>.

\* cited by examiner

VALIDATION AND GOVERNANCE OF A CLOUD COMPUTING PLATFORM BASED DATACENTER

BACKGROUND

Field of Art

This disclosure relates in general to cloud computing platforms, and in particular to performing validation and governance of changes made to a declarative specification of a data center that is intended for deployment in a target public cloud environment.

Description of the Related Art

Cloud computing platforms (or cloud platforms) such as Amazon Web Services™ (AWS™), Google Cloud Platform™ (GCP™), Azure™, have become increasingly popular in providing software, platform, and infrastructure services to entities. For instance, cloud platforms may provide on-demand network access to servers, storage, databases, content delivery, and other services that may be used to integrate technical and non-technical solutions. Conventional data centers needed by organizations were built, maintained and modified by the organizations themselves. However, given the significant overhead in building, maintaining, and modifying them, organizations are shifting data centers to cloud platforms that provide scalability ad elasticity of the required resources.

Organizations maintaining cloud infrastructure on cloud platforms may use continuous delivery platforms that can manage and deploy applications on cloud platforms. Such continuous delivery platforms allow organizations to simplify software deployment process and manage applications, firewalls, clusters, servers, load balancers, and other computing infrastructure on the cloud platform. However, maintaining large data centers on a cloud platform using a continuous delivery platform can be complex. Such large data centers may require maintaining millions of lines of instructions of such platforms. Furthermore, multi-tenant systems manage data and applications for a large number of organizations representing tenants of the multi-tenant system. Infrastructure as code may be used for provisioning and deploying data centers using code rather than physical hardware configuration files or interactive configuration tools. However, significant challenges remain in ensuring validation and governance for changes made to a platform-independent declarative specification of a data center that may be subsequently provisioned and deployed on a target cloud platform.

Accordingly, conventional techniques for using infrastructure as code for developing a data center for a target cloud platform fail to provide automated validation and governance in the course of building, provisioning, and deploying the datacenter.

Figure 1:
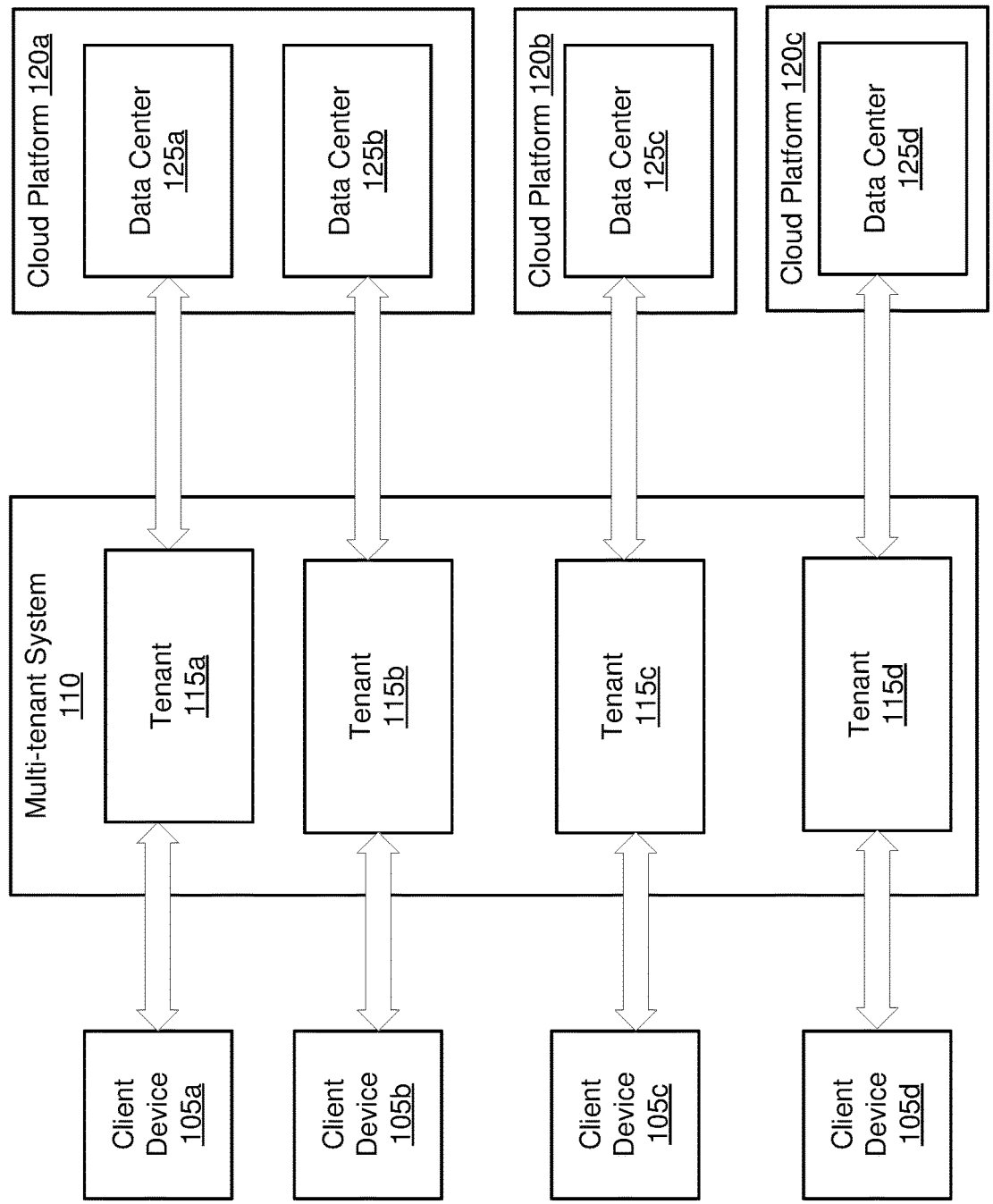
FIG. 1 is a block diagram of a system environment illustrating a multi-tenant system configuring data centers on cloud platforms, according to an embodiment.

The figures depict various embodiments for purposes of illustration only. One skilled in the art will readily recognize from the following discussion that alternative embodiments of the structures and methods illustrated herein may be employed without departing from the principles of the embodiments described herein.

The figures use like reference numerals to identify like elements. A letter after a reference numeral, such as "130a," indicates that the text refers specifically to the element having that particular reference numeral. A reference numeral in the text without a following letter, such as "130," refers to any or all of the elements in the figures bearing that reference numeral.

DETAILED DESCRIPTION

Cloud platforms provide computing resources, such as storage, computing resources, applications, and so on to computing systems on an on-demand basis via a public network such as internet. Enterprises can create a data center using a cloud platform for use by users of the enterprise. Infrastructure as code may be used for provisioning and deploying data centers using code rather than physical hardware configuration files or interactive configuration tools. However, significant challenges remain in ensuring validation and governance for changes made to a platform-independent declarative specification of a data center that may be subsequently provisioned and deployed on a target cloud platform.

Embodiments provide validation and governance when computing systems (or systems) generate data centers on a target cloud platform using a cloud platform infrastructure language that is cloud platform independent. The system receives a platform-independent declarative specification of the data center from a user and information identifying the target cloud platform for deploying a data center based on the platform-independent declarative specification. The system receives a modified platform-independent declarative specification based on changes to the platform-independent declarative specification from one or more owners of data center entities and performs end-to-end validation of the modified platform-independent declarative specification. The system retrieves a set of predefined validation rules that is applicable to the modified platform-independent declarative specification and performs a set of validations of the modified platform-independent declarative specification based on the retrieved set of predefined validation rules that is applicable to the modified platform-independent declarative specification. Additionally, the system may receive modifications to the set of predefined validation rules from an owner of a data center entity. Thus, the owner may add, delete, enable, disable, and otherwise modify a predefined validation rule. When the performed set of validations of the modified platform-independent declarative specification indicate a success, the system performs a sequence of validations based on a set of simulated processes executing on the modified platform-independent declarative specification. The simulated processes include simulating compilation of the modified platform-independent declarative specification to generate a simulated platform-specific metadata representation, using the simulated platform-specific metadata representation to generate a simulated provisioning of cloud resources on the target platform, and using the simulated provisioning of cloud resources on the target platform to generate a simulated deployment of the data center. When the sequence of validations indicate success, the system sends a notification of end-to-end validation success in association with the received one or more changes to the platform-independent declarative specification to the one or more owners of the data center entities. In embodiments described herein, when there is an indication of validation failure of any particular validation process from either the performed set of validations or the performed sequence of validation, the system sends a notification of the validation failure of the particular performed validation to the one or more owners of the data center entities, and receives a newer modified platform-independent declarative specification based on receiving one or more further changes from the one or more owners of data center entities. The system subsequently proceeds with performing a set of validations of the newer modified platform-independent declarative specification based on the retrieved set of predefined validation rules that is applicable to the modified platform-independent declarative specification. The system also performs governance of any changes to any data center entity, by ensuring that approval of the changes are received only from a predefined set of data center entity owner teams.

In embodiments, described herein, the system may represent a multi-tenant system but is not limited to multi-tenant systems and can be any online system or any computing system with network access to the cloud platform.

Overall System Environment

FIG. 1 is a block diagram of a system environment illustrating a multi-tenant system configuring data centers on cloud platforms according to an embodiment. The system environment 100 comprises a multi-tenant system 110, one or more cloud platforms 120, and one or more client devices 105. In other embodiments, the system environment 100 may include more or fewer components.

The multi-tenant system 110 stores information of one or more tenants 115. Each tenant may be associated with an enterprise that represents a customer of the multi-tenant system 110. Each tenant may have multiple users that interact with the multi-tenant system via client devices 105. With the multi-tenant system 110, data for multiple tenants may be stored in the same physical database. However, the database is configured so that data of one tenant is kept logically separate from that of other tenants so that one tenant does not have access to another tenant's data, unless such data is expressly shared. It is transparent to tenants that their data may be stored in a table that is shared with data of other customers. A database table may store rows for a plurality of tenants. Accordingly, in a multi-tenant system, various elements of hardware and software of the system may be shared by one or more tenants. For example, the multi-tenant system 110 may execute an application server that simultaneously processes requests for a number of tenants. However, the multi-tenant system enforces tenant-level data isolation to ensure that jobs of one tenant do not access data of other tenants.

A cloud platform may also be referred to as a cloud computing platform or a public cloud environment. A tenant may use the cloud platform infrastructure language to provide a declarative specification of a data center that is created on a target cloud platform 120. A tenant 115 may create one or more data centers on a cloud platform 120. A data center represents a set of computing resources including servers, applications, storage, memory, and so on that can be used by users, for example, users associated with the tenant.

The computing resources of a data center are secure and may not be accessed by users that are not authorized to access them. For example, a data center 125*a* that is created for users of tenant 115*a* may not be accessed by users of tenant 115*b* unless access is explicitly granted. Similarly, data center 125*b* that is created for users of tenant 115*b* may not be accessed by users of tenant 115*a*, unless access is explicitly granted. Furthermore, services provided by a data center may be accessed by computing systems outside the data center, only if access is granted to the computing systems in accordance with the declarative specification of the data center.

Examples of cloud platforms include AWS (AMAZON web services), GOOGLE cloud platform, or MICROSOFT AZURE. A cloud platform 120 offers computing infrastructure services that may be used on demand by a tenant 115 or by any computing system external to the cloud platform 120. Examples of the computing infrastructure services offered by a cloud platform include servers, storage, databases, networking, security, load balancing, software, analytics, intelligence, and other infrastructure service functionalities. These infrastructure services may be used by a tenant 115 to build, deploy, and manage applications in a scalable and secure manner.

The multi-tenant system 110 may include a tenant data store that stores data for various tenants of the multi-tenant store. The tenant data store may store data for different tenants in separate physical structures, for example, separate database tables or separate databases. Alternatively, the tenant data store may store data of multiple tenants in a shared structure. For example, user accounts for all tenants may share the same database table. However, the multi-tenant system stores additional information to logically separate data of different tenants.

Each component shown in FIG. 1 represents one or more computing devices. A computing device can be a conventional computer system executing, for example, a Microsoft™ Windows™-compatible operating system (OS), Apple™ OS X, and/or a Linux distribution. A computing device can also be a client device having computer functionality, such as a personal digital assistant (PDA), mobile telephone, video game system, etc. Each computing device stores software modules storing instructions.

The interactions between the various components of the system environment 100 are typically performed via a network, not shown in FIG. 1. In one embodiment, the network uses standard communications technologies and/or protocols. In another embodiment, the entities can use custom and/or dedicated data communications technologies instead of, or in addition to, the ones described above.

Although the techniques disclosed herein are described in the context of a multi-tenant system, the techniques can be implemented using other systems that may not be multi-tenant systems. For example, an online system used by a single organization or enterprise may use the techniques disclosed herein to create one or more data centers on one or more cloud platforms 120.

System Architecture

Figure 2:
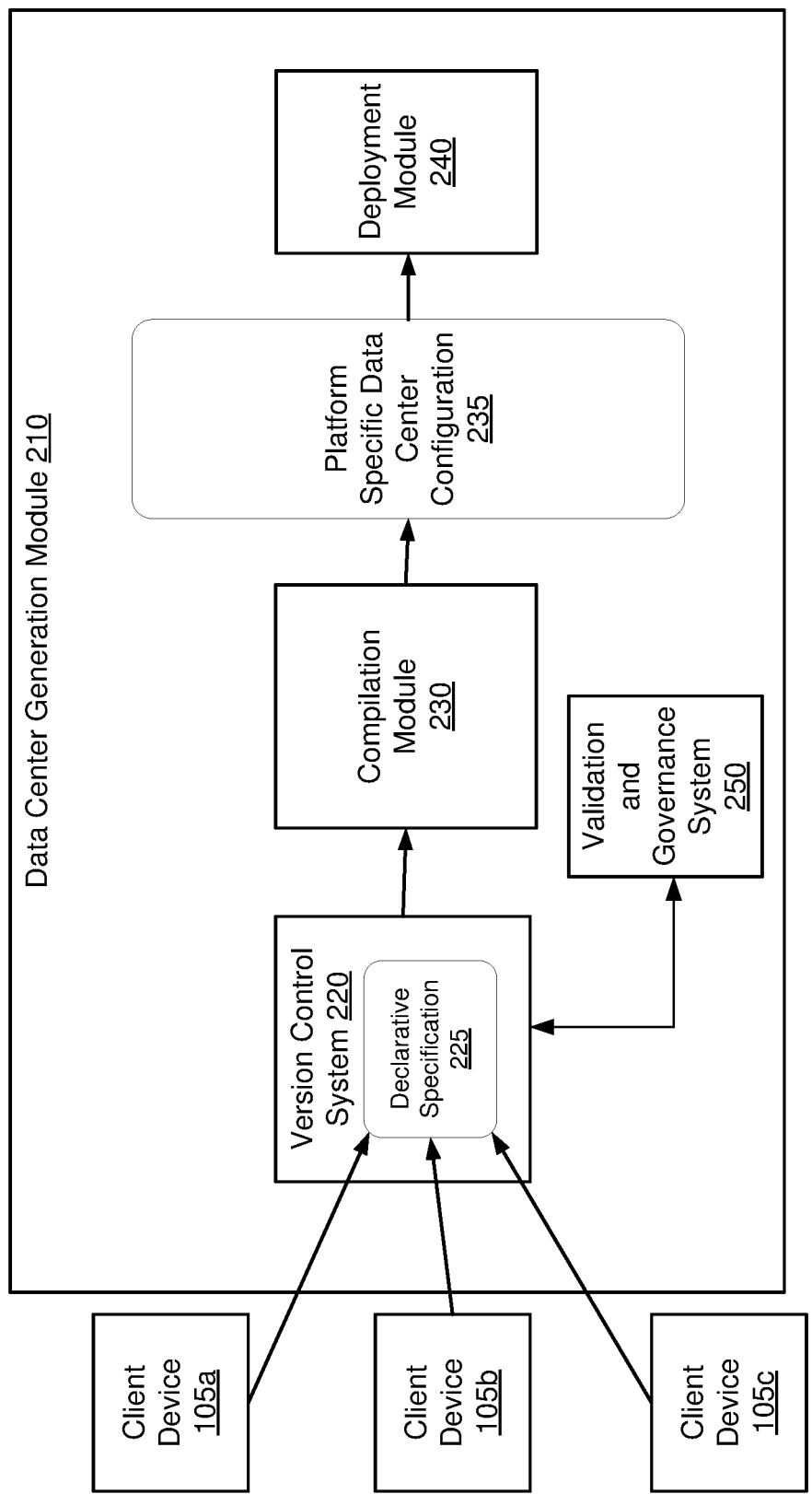
FIG. 2 is a block diagram illustrating the system architecture of a data center generation module, according to an embodiment.

FIG. 2 is a block diagram illustrating the system architecture of a data center generation module according to an embodiment. The data center generation module 210 comprises a version control system 220, a compilation module 230, a deployment module 240, and a validation and governance system 250. Other embodiments can have different and/or other components than the ones described here, and that the functionalities can be distributed among the components in a different manner.

The version control system 220 stores one or more versions of a platform independent declarative specification 225 of a data center. The platform independent declarative specification 225 of a data center specifies various entities of the data center including the services available in the data center and their interactions. Expert users may modify the platform independent declarative specification, for example, using applications executing on client devices 105. The modifications to the platform independent declarative specification may be submitted via commit requests of the version control system 220. The version control system 220 allows users to create snapshots of the platform independent declarative specification at various stages of modifications, thereby allowing users to rollback certain changes and apply a previous version of the platform independent declarative specification.

The compilation module 230 receives the platform independent declarative specification 225 and a target cloud platform as input and generates a cloud platform specific metadata representation 235 for the target cloud platform. The architecture of the compilation module 230 and processes executed by the compilation module 230 are described in further detail herein, for example, in the description of FIG. 3. The deployment module 240 deploys the generated cloud platform specific metadata representation 235 on the target cloud platform to create a data center on the target cloud platform according to the declarative specification 225.

In some embodiments, the data center generation module 210 includes the validation and governance system 250. Details of the architecture of the validation and governance system 250 and the processes executed by the validation and governance system 250 are provided in the description associated with FIG. 7-10

Figure 3:
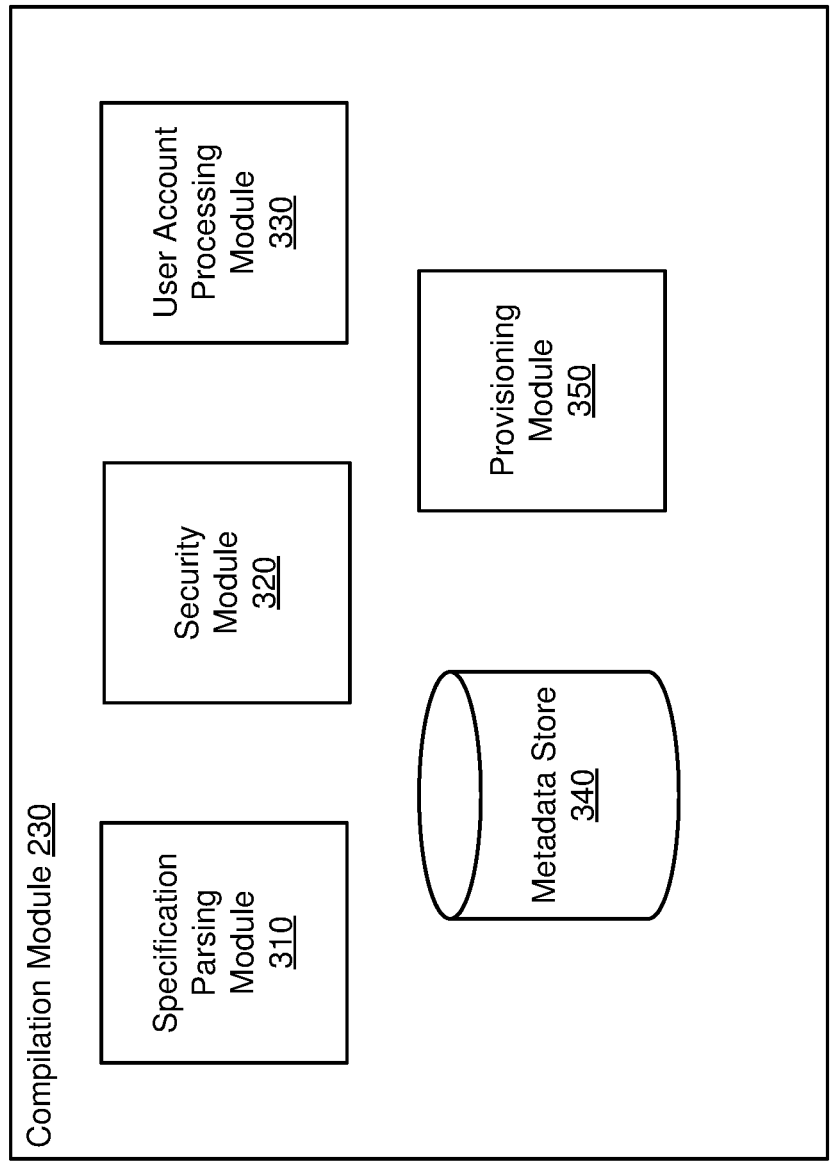
FIG. 3 is a block diagram illustrating the architecture of a compilation module, according to one embodiment.

FIG. 3 is a block diagram illustrating the architecture of a compilation module according to one embodiment. The compilation module 230 includes a specification parsing module 310, a security module 320, a user account processing module 330, a metadata store 340, and a provisioning module 350. Other embodiments may include more, fewer, or different modules than those indicated herein in FIG. 3.

The specification parsing module 310 parses a declarative specification 225 of a data center received as input by the compilation module 230. The specification parsing module 310 identifies individual data center entities represented within the declarative specification 225 of the data center. The specification parsing module 310 generates data structures and metadata representations of the data center entities and provides the generated data structures and metadata representations to other modules of the compilation module 230 for further processing.

The security module 320 handles security aspects of various data center entities that are specified in the declarative specification 225 of the data center. For example, the security module 320 ensures that interactions within various data center entities, interactions of data center entities with systems outside the data center generated conform to security policies specified within the declarative specification 225 of the data center. The security policy may specify which data center entities can be accessed by external systems, which external system may be accessed by specific data center entities, whether a service can interact with another service, whether a service group can interact with another service group, whether a service can access a specific functionality or API (application programming interface) supported by the cloud platform, and so on. An external system may be identified using an IP address or domain name.

The user account processing module 330 creates user accounts in the cloud platforms where the data center is being created. These user accounts are used for various purposes, for example, for debugging, simulation of data center, for interaction with team members and so on.

The metadata store 340 stores various transformed metadata representations of data centers that are generated by the compilation module 230. The transformed metadata representations may be used for performing rollback to a previous version if an issue is encountered in a current version of the data center. The transformed metadata representations may be used for validation, auditing, governance, and so on at various stages of the transformation process.

The provisioning module 350 creates instructions for provisioning resources on target cloud systems and executes them for deploying the data center. In an embodiment, the provisioning system creates pipelines for executing on the cloud platform. The pipelines comprise stages that include instructions for provisioning services or deploying applications for creating various services on the cloud platform according to the declarative specification describing the data center.

Figure 4:
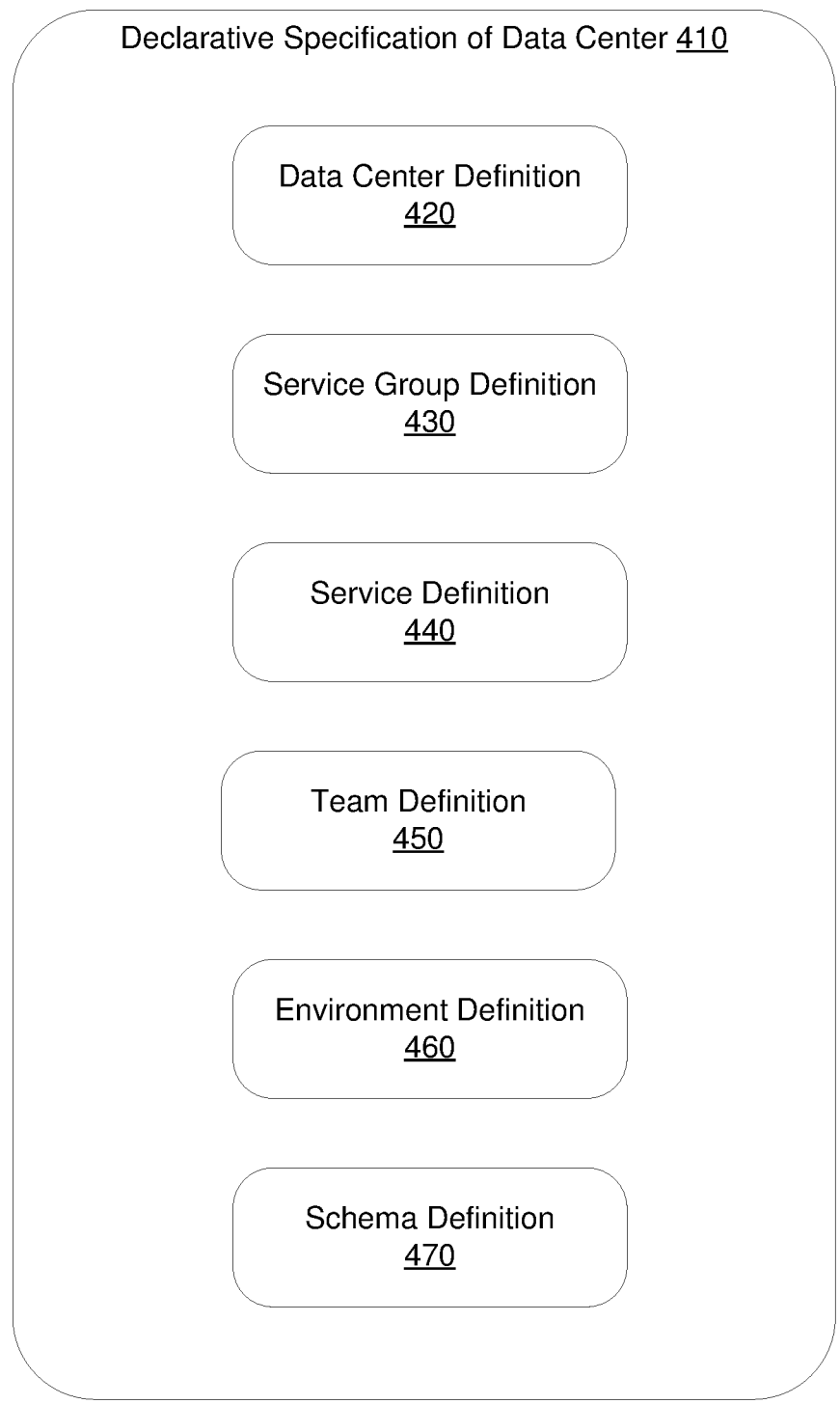
FIG. 4 illustrates an example of a data center declarative specification, according to one embodiment.

FIG. 4 illustrates an example of a declarative specification of a data center according to one embodiment. The declarative specification 410 includes multiple data center entities. A data center entity is an instance of a data center entity type and there can be multiple instances of each data center entity type. Examples of data center entities include data centers, service groups, services, teams, environments, and schemas.

The declarative specification 410 includes definitions of various types of data center entities including service group, service, team, environment, and schema. The declarative specification includes one or more instances of data centers. Following is a description of various types of data center entities and their examples. The examples are illustrative and show some of the attributes of the data center entities. Other embodiments may include different attributes and an attribute with the same functionality may be given a different name than that indicated herein. In an embodiment, the declarative specification is specified using hierarchical objects, for example, JSON (Javascript object notation) that conform to a predefined schema.

A service group 420 represents a set of capabilities and features and services offered by one or more computing systems that can be built and delivered independently, in accordance with one embodiment. A service group may be also referred to as a logical service group, a functional unit, or a bounded context. A service group 420 may also be viewed a set of services of a set of cohesive technical use-case functionalities offered by one or more computing systems. A service group 420 enforces security boundaries. A service group 420 defines a scope for modifications. Thus, any modifications to an entity, such as a capability, feature, or service offered by one or more computing systems within a service group 420 may propagate as needed or suitable to entities within the service group, but does not propagate to an entity residing outside the bounded definition of the service group 420. A data center may include multiple service groups 420. A service group definition specifies attributes including a name, description, an identifier, schema version, and a set of service instances. An example of a service group is a blockchain service group that includes a set of services used to providing blockchain functionality. Similarly, a security service group provides security features. A user interface service group provides functionality of specific user interface features. A shared document service group provides functionality of sharing documents across users. Similarly, there can be several other service groups.

Service groups support reusability of specification so that tenants or users interested in developing a data center have a library of service groups that they can readily use. The boundaries around services of a service groups are based on security concerns and network concerns among others. A service group is associated with protocols for performing interactions with the service group. In an embodiment, a service group provides a collection of APIs (application programming interfaces) and services that implement those APIs. Furthermore, service groups are substrate independent. A service group provides a blast radius scope for the services within the service group so that any failure of a service within the service group has impact limited to services within the service group and has minimal impact outside the service group.

Following is an example of a specification of a service group. The service group specifies various attributes representing metadata of the service group and includes a set of services within the service group. There may be other types of metadata specified for a service group, not indicated herein.

```
{
"service_group": [
  {
    "cells": [ ],
    "description": "Service group Service Instance Definitions",
    "service_group_id": "id1 ",
    "name": "name1",
    "schema_version": "1.0",
    "cluster_instances": [
      {
        "cluster_instance_name": "cluster1",
        "cluster_type": "cluster_type1"
      },
      {
        "cluster_instance_name": "cluster2",
        "cluster_type": "cluster_type 1"
      },
      {
        "cluster_instance_name": "cluster3",
        "cluster_type": "cluster_type2"
      }
    ],
```

-continued

```
"service_instances": [
  {
    "service_instance_name": "serviceinstance0001",
    "service_type": "servicetype1"
  },
  {
    "service_instance_name": "serviceinstance0002",
    "service_type": " servicetype1"
    "cluster_instance": "cluster1"
  },
  {
    "service_instance_name": "serviceinstance0003",
    "service_type": " servicetype2"
  },
  ...
],
"service_teams": ["team1"],
"type": "servicetype"
"security_groups":[
  {
    "name":"group1",
    "policies":[
      {
        "description":"Allow access from site S1",
        "destination":{ "groups":[ "group2" ] },
        "environments":[ "dev", "test", "staging"],
        "source":{
          "iplist":"URL1",
          "filters":[ filter-expression" ]
        }
      }
    ]
  }
]
}
]
}
```

As shown in the example above, a service group may specify a set of clusters. A cluster represents a set of computing nodes, for example, a set of servers, a set of virtual machines, or a set of containers (such as KUBERNETES containers). A physical server may run multiple containers, where each container has its own share of filesystem, CPU, memory, process space, and so on.

The service group specifies a set of services. A service group may specify a cluster for a service so that the data center deployed on a cloud platform runs clusters of computing nodes and maps the services to clusters based on the specified mapping if included in the declarative specification. For example, in the service group example shown above, the service instance serviceinstance0002 is specified to run on cluster instance cluster1.

The service group may specify security groups, each security group specifying a set of services that are allowed to interact with each other. Services outside the security group are required to pass additional authentication to communicate with services within the security group. Alternatively, the services within a security group use one protocol to interact with each other and services outside the security group use a different protocol that requires enhances authentication to interact with services within the security group. Accordingly, a security group specifies policies that determine how services can interact with each other. A security policy may specify one or more environments for which the security policy is applicable. For example, a security policy policy 1 may apply to a particular environment env 1 (e.g., production environment) and another security policy policy2 may apply to another environment env2 (e.g., development environment). A security policy may be specified for a service group type or for a specific service type.

In an embodiment, the security policy specifies expressions for filtering the service groups based on various attributes so that the security policy is applicable to the filtered set of service groups. For example, the security policy may specify a list of IP (internet protocol) addresses that are white listed for a set of service groups identified by the filtered set and accordingly these computing systems are allowed access to the service group or to specific set of services within the service group.

In an embodiment, a security policy may specify for a service group, a set of source services and a set of destination services. The source services for a particular service specify the services outside the security group that are allowed to connect with this particular service. The destination services for a particular service specify the services outside the security group that this particular service needs to connect to. During provisioning and deployment, the data center generation module generates instructions for the cloud platform that implement specific network policies using cloud platform specific features and network functionality such that the network policies implement the security policies specified in the declarative specification.

A data center entity called a cell represents a set of services that interact with each other in a vertical fashion and can be scaled by additional instances or copies of the cell, i.e., copies of the set of services. Creating multiple instances of a cell allows a system to scale a set of services that interact with each other.

A service definition specifies metadata for a type of service, for example, database service, load balancer service, and so on. The metadata be describe various attributes of a service including a name of the service, description of the service, location of documentation for the service, any sub-services associated with the service, an owner for the service, a team associated with the service, build dependencies for the service specifying other services on which this service depends at build time, start dependencies of the service specifying the other services that should be running when this particular service is started, authorized clients, DNS (domain name server) name associated with the service, a service status, a support level for the service, and so on. The service definition specifies a listening ports attribute specifying the ports that the service can listen on for different communication protocols, for example, the service may listen on a port p1 for UDP protocol and a port p2 for TCP protocol. Other services within the data center can interact with a service via the ports specified by the service.

The service definition specifies an attribute outbound access that specifies destination endpoints, for example, external URLs (uniform resource locators) specifying that the service needs access to the specified external URLs. During deployment, the data center generation module ensures that the cloud platform implements access policies such that instances of this service type are provided with the requested access to the external URLs.

The outbound access specification may identify one or more environment types for the service for which the outbound access is applicable. For example, an outbound access for a set of endpoints S1 may apply to a particular environment env1 (e.g., production environment) and outbound access for a set of endpoints S2 may apply to another environment env2 (e.g., development environment).

Following is an example of a service definition.

```
{
  "service definition": [
    {
      "authorized_clients": [ ],
      "build_dependencies": [ ],
```
-continued
```
      "description": "description of service",
      "dns_name": "dns1",
      "documentation": "URL",
      "name": "name1",
      "namespace": "space1",
      "service_owner": "user1",
      "service_status": "GA",
      "service_team": "team1",
      "support_level": "STANDARD",
      "start_dependencies": ["svc5", "svc7", ...],
      "sub_services": [ "service1", " service2", " service3", ... ],
      "listening_ports":[
        { "protocol":"tcp", "ports":[ "53" ] },
        { "protocol":"udp","ports":[ "53" ] }
      "outbound_access":[
        {
          "destination":[
            {
              "endpoints":[ ".xyz.com:443", ".pqr.com:443" ]
            }
          ]
        }
      ],
    }
  ]
}
```

A team definition 450 includes team member names and other attributes of a team for example, name, email, communication channel and so on. Following is an example of a team definition. A service may be associated with one or more teams that are responsible to modifications made to that service. Accordingly, any modification made to that service is approved by the team. A service may be associated with a team responsible for maintenance of the service after it is deployed in a cloud platform. A team may be associated with a service group and is correspondingly associated with all services of that service group. For example, the team approves any changes to the service group, for example, services that are part of the service group. A team may be associated with a data center and is accordingly associated with all service groups within the data center. A team association specified at a data center level provides a default team for all the service groups within the data center and further provides a default team for all services within the service groups.

According to an embodiment, a team association specified at the functional level overrides the team association provided at the data center level. Similarly, a team association specified at the service level overrides the default that may have been provided by a team association specified at the service group level or a data center level. A team can decide how certain action is taken for the data center entity associated with the team. The team associations also determine the number of accounts on the cloud platform that are created for generating the final metadata representation of the data center for a cloud platform by the compiler and for provisioning and deploying the data center on a cloud platform. The data center generation module 210 creates one or more user accounts in the cloud platform and provides access to the team members to the user accounts. Accordingly, the team members are allowed to perform specific actions associated with the data center entity associated with the team, for example, making or approving structural changes to the data center entity or maintenance of the data center entity when it is deployed including debugging and testing issues that may be identified for the data center entity.

Conventional techniques associate the same team with the data center through out the design process thereby resulting in the organizational structure having an impact on the design of the data center or service group as stated by Conwoy's law. Conwoy's law states that organizations which design systems are constrained to produce designs which are copies of the communication structures of these organizations. Embodiments decouple the team definition from the constructions that define the data center entity, thereby reducing the impact of the teams on the design and architecture of the data center entity.

```
{
  "team_definition": [
    {
      "name": "team1",
      "description": "description of team",
      "admins": [
        "user1",
        "user2",
        "user3",
        "user4",
        ...
      ],
      "team_id": "id1",
      "owner": "owner_id",
      "email": "team1@xyz.com"
    }
  ],
  "communication_channel": "channel1"
  "schema version": "1.0"
}
```

An environment definition 460 specifies a type of system environment represented by the data center, for example, development environment, staging environment, test environment, or production environment. A schema definition 470 specifies schema that specifies syntax of specific data center entity definitions. The schema definition 470 is used for validating various data center entity definitions. The data center generation module determines security policies for the data center in the cloud platform specific metadata representation 235 based on the environment. For example, a particular set of security policies may be applicable for an environment env1 and a different set of security policies may be applicable for environment env2. For example, the security policies provide much more restricted access in production environment as compared to development environment. The security policy may specify the length of time that a security token is allowed to exist for specific purposes. For example, long access tokens (e.g., week long access tokens) may be allowed in development environment but access tokens with much smaller life time (e.g., few hours) used in production environment. Access tokens may allow users or services with access to specific cloud platform resources.

A data center definition 420 specifies the attributes and components of a data center instance. A declarative specification may specify multiple data center instances. The data center definition 420 specifies attributes including a name, description, a type of environment, a set of service groups, teams, domain name servers for the data center, and so on. A data center definition may specify a schema definition and any metadata representation generated from the data center definition is validated against the specified schema definition. A data center includes a set of core services and capabilities that enable other services to function within the data center. An instance of a data center is deployed in a particular cloud platform and may be associated with a particular environment type, for example, development, testing, staging, production, and so on.

Following is a definition of a data center instance. The data center instance definition includes a list of service groups included in the data center instance and other attributes including an environment of the data center, a data center identifier, a name, a region representing a geographical region, one or more teams associated with the data center, and a schema version.

```
{
  "datacenter_instance": {
    "environment": "env1",
    "datacenter_instance_identifier": "id1",
    "name": "data_center1",
    "region": "region1",
    "service_groups": [
      "service_group1",
      "service_group2",
      "service_group3",
      "service_group4",
      ...
    ],
    "schema_version": "1.0",
    "admin_team":"admins",
    ...
  }
}
```

Figure 5:
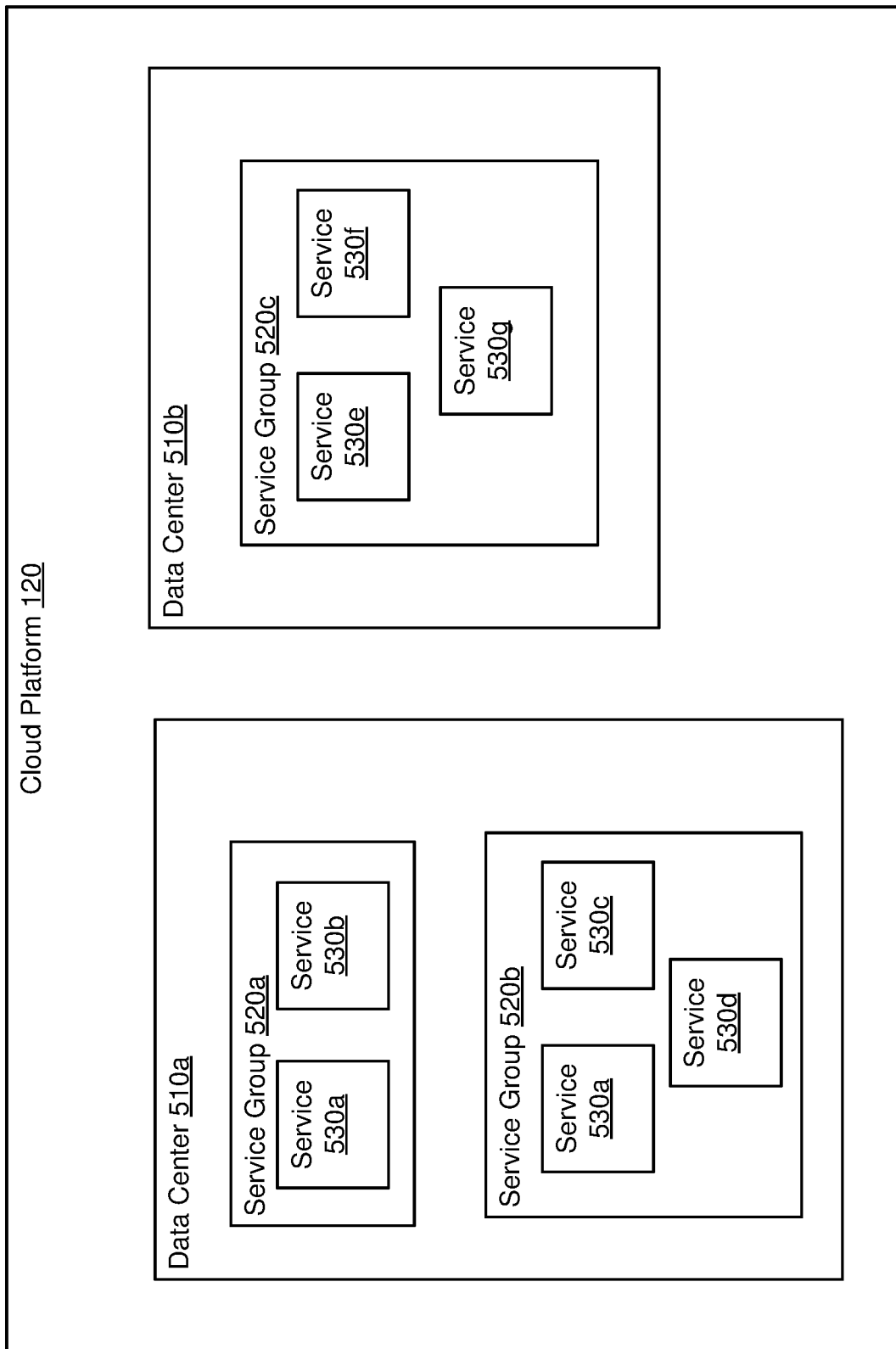
FIG. 5 illustrates example data centers created on a cloud platform based on a declarative specification, according to one embodiment.

FIG. 5 illustrates some example data centers created on a cloud platform based on a declarative specification according to one embodiment. The data centers 510 may be created based on a declarative specification processed by the data center generation module 210. As shown in FIG. 5, multiple data centers may be configured within a cloud platform 120. Each data center 510 may correspond to a tenant 115 of a multi-tenant system 110. A tenant 115 may create one or more data centers 510. Alternatively, a data center 510 may be created by any computing system. Each data center includes one or more service groups. For example, data center 510a includes service groups 520a and 520b and data center 510b includes service group 520c. A data center may include multiple instances of a particular type of service group. Each service group includes a set of services. For example, service group 520a includes services 530a and 530b, service group 520b includes services 530a, 530b, and 530c, and service group 520c includes services 530e, 530f, and 530g. A service group may include multiple instances of services of the same service type.

Figure 6:
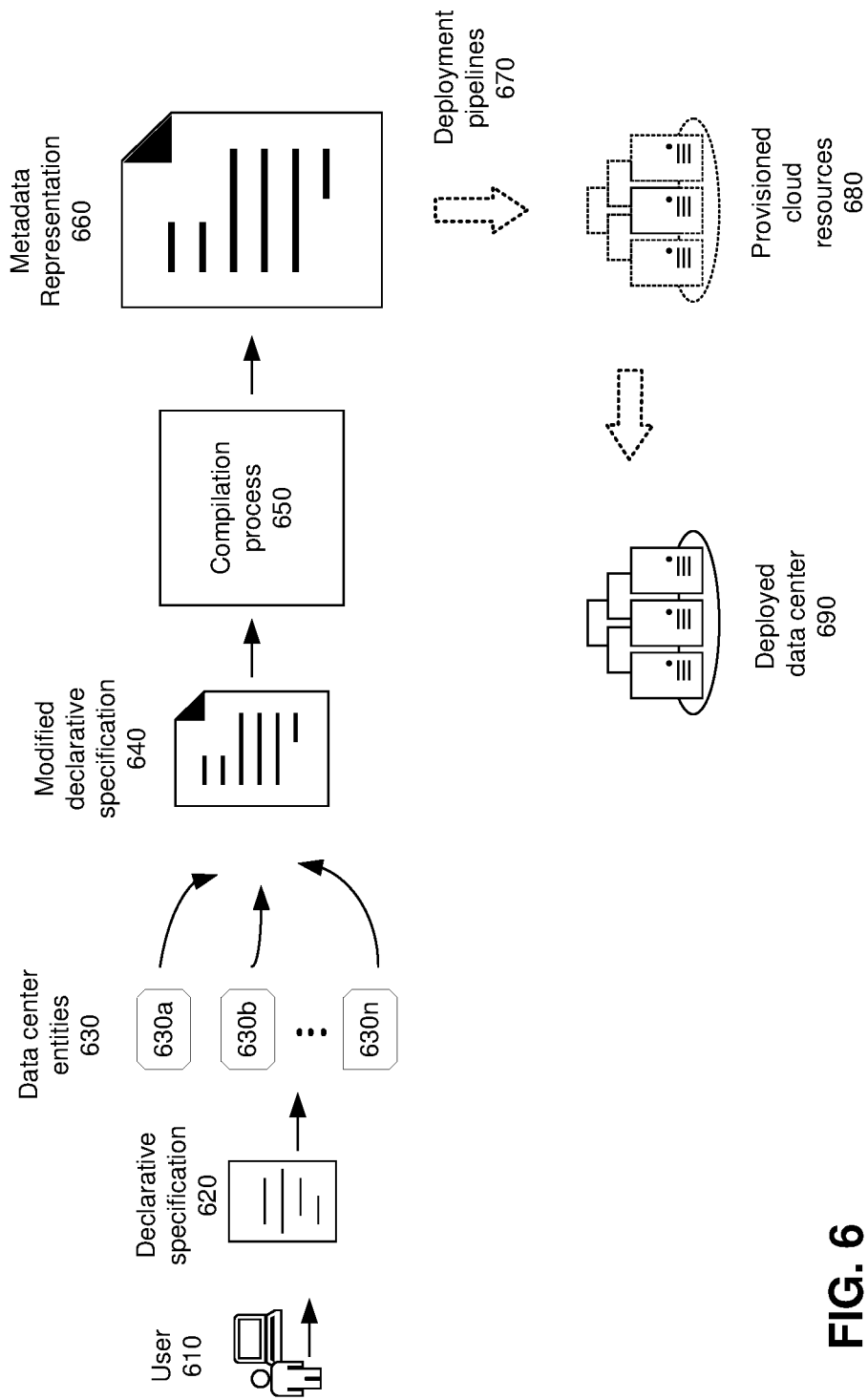
FIG. 6 is a block diagram illustrating generation of a platform-specific metadata representation of a data center that is ready for provisioning and deployment on a target cloud-based platform, according to one embodiment.

FIG. 6 is a block diagram illustrating generation of a platform-specific metadata representation of a data center, from a platform-independent declarative specification of the data center, that is ready for provisioning and deployment on a target cloud-based platform, according to one embodiment. Examples of a target public cloud-based platform include, for example, Amazon Web Services™ (AWS™), Google Cloud Platform™ (GCP™), Azure™ etc.

A user 610 provides a high-level declarative specification 620 of a desired data center for provisioning and deployment on a target cloud-platform. In some embodiments, the user 610 may represent a tenant of a multi-tenant system that operates on a public or private cloud environment. The user 610 may represent a commercial enterprise that seeks to move their infrastructure from traditional data centers to a target public cloud platform. The user 610 may provide the declarative specification 620 using any client device.

The declarative specification 620 may include any of: service specifications, networking specifications, engineering specifications, security specifications, and environment specification, etc. The declarative specification 620 is used to construct a set of data center entities 630 (630*a*, 630*b*, ..., 630*n*). The data center entities 630 are composed of multiple different entity declarations that act as basic building blocks for constructing a platform-specific metadata representation of the data center 660. For example, an entity may include definitions of computational services that are required to be run on the finally deployed data center, may include logical entities that define boundaries, such as for example, networking requirements, security constraints, etc. In some embodiments, the construction of the data center entities 630 may be partially or entirely hand-crafted by a set of corresponding data center entity owner teams. In some embodiments, the construction of the data center entities 630 from the declarative specification 620 may be performed automatically.

In embodiments described herein, the data center entities 630 are assembled into a modified declarative specification 640. The modified declarative specification 640 is a platform-independent declarative specification that captures high level service metadata, networking specifications, engineering specifications, security requirements, and environment information based on the declarative specification 620.

The system compiles the modified platform-independent declarative specification 640 to generate a metadata representation 660 that is a platform-specific metadata representation of the data center. In embodiments described herein, generation of the platform-specific metadata representation is an automated process. The system automates the process of transforming the modified platform-independent declarative specification 640 through an automated compilation process 650 to generate metadata representation 660 that is a platform-specific metadata representation of the data center.

The platform-specific metadata representation 660 provides instructions to deployment pipelines 670 for provisioning cloud resources 680 and for generating a deployed data center 690 based on the provisioned cloud resources 680 on the target cloud platform.

The conversion of the metadata declarative specification 640 to the metadata representation 660 though compilation, and subsequently through the deployment pipelines 670 to the provisioned cloud resources 680 and the deployed data center 690 is automated. The automation enables speed of data center deployment through faster execution and removes the risk of human error such as manual misconfiguration. Furthermore, the automation increases reliability in the final deployed data center 690 on the target cloud-platform. However, it is important to ensure that the entire chain of transformations from the crafted data center entities 630 to the deployed data center 670 preserve the validity of the generated representation at each phase. This is ensured by performing end-to-end validation of the chain of transformations. The end-to-end validation process is described below.

End-to-End Validation of Changes to the Declarative Specification

Figure 7:
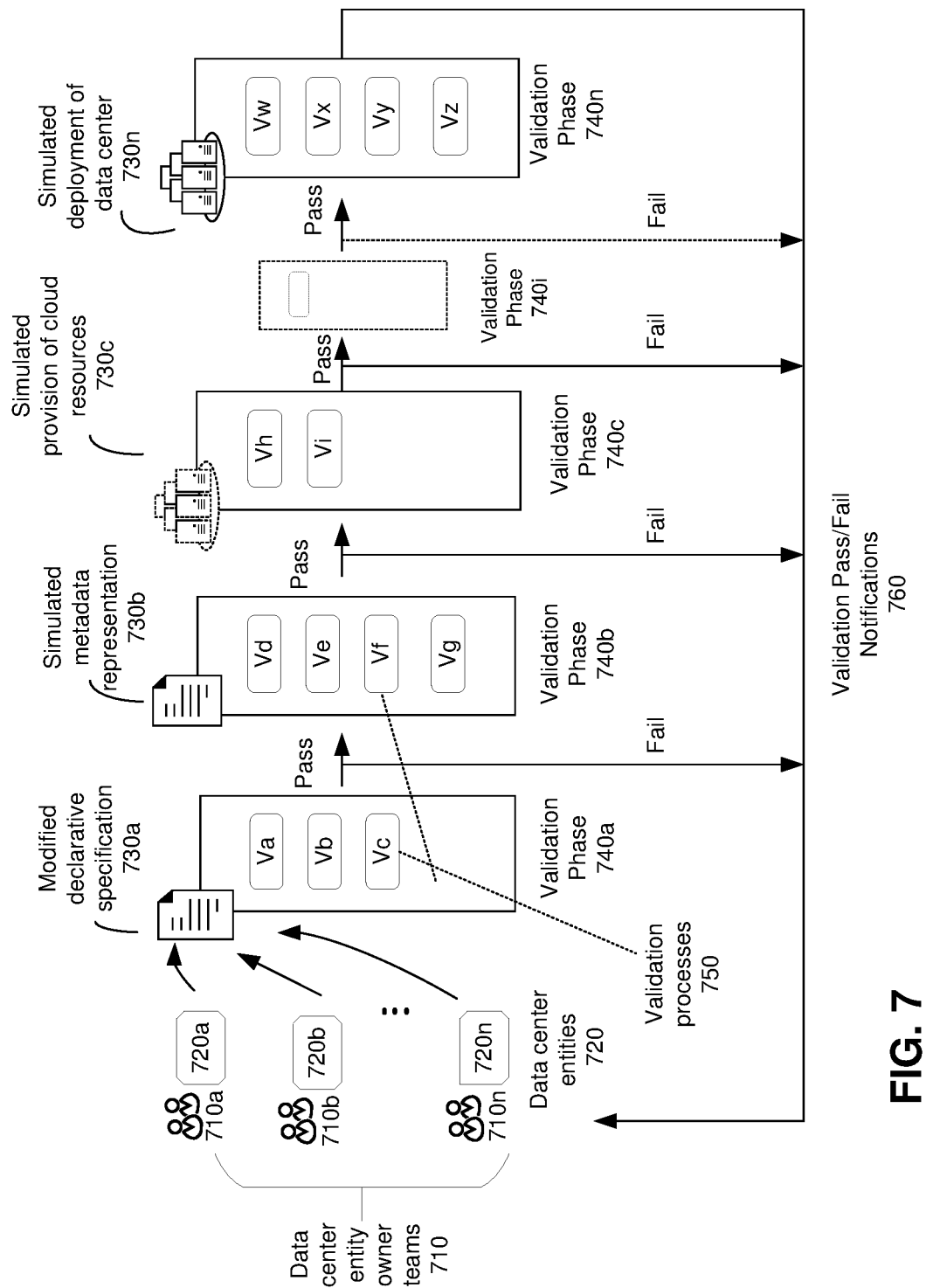
FIG. 7 illustrates performing end-to-end validation of changes made to the platform-independent declarative specification of a data center, according to one embodiment.

FIG. 7 illustrates performing end-to-end validation of changes in the platform-independent declarative specification of a data center, according to one embodiment.

FIG. 7 depicts data center entities 720 (720*a*, 720*b*, ..., 720*n*) constructed by corresponding data center entity owner teams 710 (710*a*, 710*b*, ..., 710*n*). In some embodiments, the data center entities 720 may be handcrafted by the data center owner teams 710 from a platform-independent declarative specification 620 that is provided by a user 610 (as depicted in FIG. 6). The data center entities 720 are assembled to create a platform-independent declarative specification 730*a*. This specification 730*a* is an expanded and modified version of the high-level declarative specification received from the user (i.e., declarative specification 620 received from user 610, as illustrated in FIG. 6).

End-to-end validation of the modified platform-independent declarative specification begins with a validation phase 740*a* that validates the changes made while creating the modified platform-independent declarative specification 730*a*. The changes that may be made to the platform-independent declarative specification and received from the data center entity owner teams 710 may be any of: assigning a field value to a parameter of a data center entity or changing an assigned field value to a parameter of a data center entity in the platform-independent declarative specification. Other changes that may be made to the platform-independent declarative specification and received from the data center entity owner teams 710 may be any of: redefining a parameter of a data center entity, deleting a parameter of a data center entity, or adding a new parameter to a data center entity in the platform-independent declarative specification Validation of the changes made in creating the specification 730*a* are based on a set of predefined rules that is applicable to the declarative specification. A validation phase 740 (740*a*, ..., 740*n*) may involve one or more validation processes 750 (Va, ..., Vz). Thus, for example, validation phase 740*a* is depicted as involving validation processes Va, ..., Vc. When validation phase 740*a* that is performed on specification 730*a* indicates success, then this indication of validation pass is sent through a validation pass notification 760 to the data center entity owner teams 710.

Subsequent to a validation pass for specification 730*a*, the system proceeds in the next validation phase 740*b*. During validation phase 740*b*, the system first performs a simulation of the compilation (i.e., simulates the compilation process 650 in FIG. 6) and generates a simulated platform-specific metadata representation 730*b*. This simulated metadata representation 730*b* undergoes validation (e.g., via validation processes 750 Vd, ..., Vg) based on a set of predefined rules that is applicable to the metadata representation. When validation phase 740*b* that is performed on simulated metadata representation 730*b* indicates success, then this indication of validation pass is sent through a validation pass notification 760 to the data center entity owner teams 710. Subsequent to a validation pass for simulated metadata representation 730*b*, the system proceeds in the next validation phase 740*c*. During validation phase 740*c*, the system first performs a simulation of provisioning cloud resources based on the simulated metadata representation and generates a simulated platform-specific provision of cloud resources 730*c* (i.e., the simulation of provisioned cloud resources 680 in FIG. 6). This simulated provision of cloud resources 730*c* undergoes validation (e.g., via validation processes 750 Vh, Vi) based on a set of predefined rules that is applicable to the provisioned cloud resources. When validation phase 740*c* that is performed on simulated provision of cloud resources 730*c* indicates success, then this indication of validation pass is sent through a validation pass notification 760 to the data center entity owner teams 710. Subsequent to a validation pass for the simulated provision of cloud resources 730*c*, the system proceeds in the next validation phase 740*n*. During validation phase 740*n*, the system first performs a simulation of deploying the data center based on the simulated provision of cloud resources 730*c* and generates a simulated platform-specific deployment of the data center 730*n* (i.e., the simulation of deployed data center 680 in FIG. 6). This simulated deployment of the data center 730n undergoes validation (e.g., via validation processes 750 Vw, . . . , Vz) based on a set of predefined rules that is applicable to the deployed data center. There may one or more other validation phases 740i using the simulated provision of cloud resources 730c. For example, the simulated provision of cloud resources 730c may be used to generate a simulated networking layout for the data center and undergo validation phase 740i based on a set of predefined rules that is applicable to the networking layout. In another example, the simulated provision of cloud resources 730c may be used to generate a simulated security framework for the data center and undergo validation phase 740i based on a set of predefined rules that is applicable to the security framework.

When a validation phase 740 indicate that at least one of the validation processes 750 has failed, then this indication of validation fail is sent through the validation fail notification 760 to the data center entity owner teams 710. Subsequently, the system re-starts the entire validation 740 from validation phase 740a after receiving revisions in the data center entities and after generating a newer modified declarative specification 730a based on the revisions. Thus, validation pass at each phase of the validation is required to move to the next validation phase. Validation fail at any phase re-starts the validation phase from validating the modified declarative specification—which will now be a revised modified declarative specification generated based on revisions made by one or more of the data center entity owner teams 710 to the data center entities 720 in view of the validation fail.

Validation System Architecture

Figure 8:
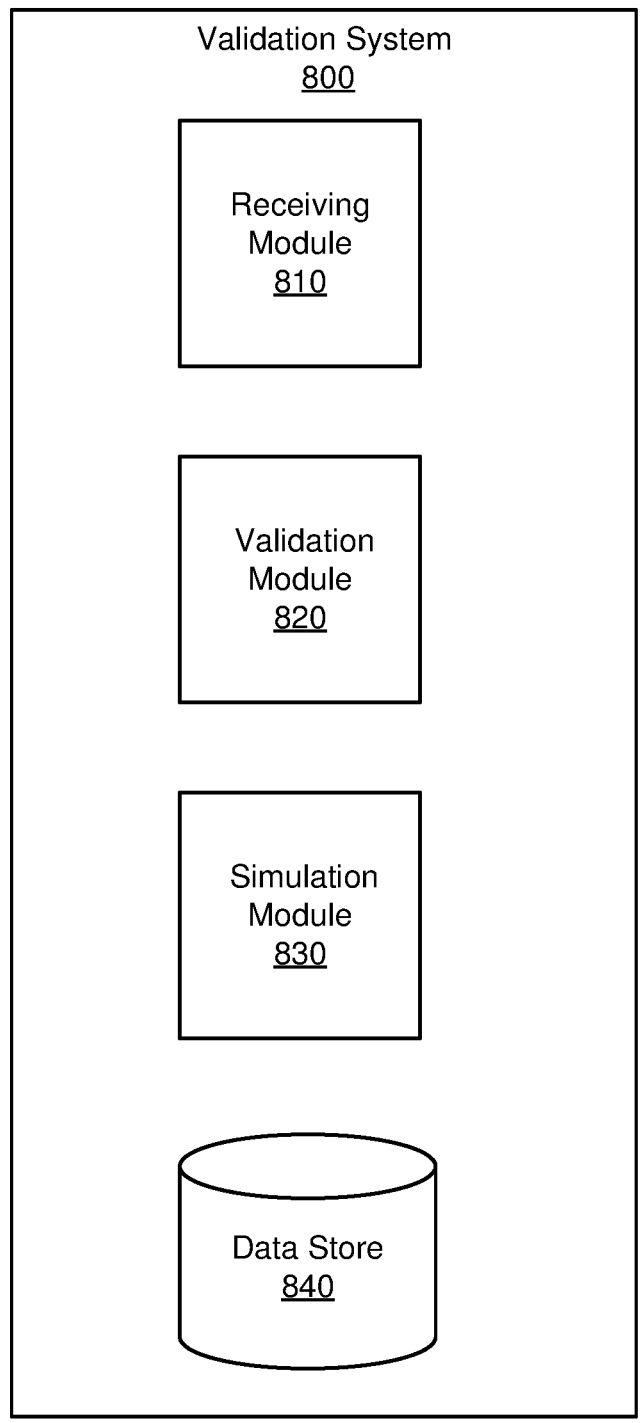
FIG. 8 is a block diagram illustrating components of a system for performing end-to-end validation of changes made to the platform-independent declarative specification of a data center, according to one embodiment.

FIG. 8 is a block diagram illustrating components of a system for performing end-to-end validation of changes in the platform-independent declarative specification of a data center, according to one embodiment.

The validation system 800 includes a receiving module 810, a validation module 820, a simulation module 830, and a data store 840. Alternative configurations of the validation system 800 may include different and/or additional modules. Functionality that is indicated as being performed by a particular module may be performed by other modules than those indicated herein. Furthermore, steps of any processes described herein can be performed in an order different from that illustrated herein.

The receiving module 810 receives a modified platform-independent declarative specification based on one or more changes to the platform-independent declarative specification that are made by owner teams of the data center entities. The receiving module 810 may also receive a newer modified platform-independent declarative specification based on changes made by the data center owner teams in response to receiving a validation fail notification during the validation phases performed by the validation module 820. In some embodiments, the receiving module 810 may alternatively retrieve the modified platform-independent declarative specification from the data store 840. The modified platform-independent declarative specification is assembled from multiple different data center entity declarations, such as, for example, declarations associated with computational services that are required to be run on the finally deployed platform-specific data center, logical entities that define boundaries associated with the finally deployed platform-specific data center, such as networking requirements, security constraints, etc. In some embodiments, the data center entity declarations may be partially or entirely hand-crafted by the data center owner teams and stored in the data store 840. In some embodiments, the data center entity declarations may be automatically generated and assembled into the platform-independent modified declarative specification upon receiving the cloud-platform independent declarative specification and target cloud platform of the data center and stored in the data store 840.

In some embodiments, the receiving module 810 may receive modifications to the set of predefined validation rules, such as an addition of a new predefined validation rule, a deletion of an existing predefined validation rule, a modification of an existing predefined validation rule, a disabling of an existing predefined validation rule, and an enabling of an existing predefined validation rule. These modifications may be received from any of the owners belonging to the data center entity owner teams. The receiving module may store the received modifications to the set of predefined validation rules in the data store 840.

The validation module 820 performs end-to-end validation of the modified platform-independent declarative specification. The end-to-end validation begins by performing a set of validations of the modified platform-independent declarative specification. The validation module 820 retrieves a set of predefined validation rules that is applicable to the modified platform-independent declarative specification. The validation module 820 performs the set of validations of the modified platform-independent declarative specification by executing a set of validation processes on the various data center entities that form the modified platform-independent declarative specification. These validation processes are based on the retrieved set of predefined validation rules that is applicable to the modified platform-independent declarative specification. The set of validation processes performed by the validation module 820 ensures that any of the changes that are made to the data center entity declarations and definitions are consistent with the retrieved set of predefined validation rules. The changes made to the data center entities may be, for example, assigning a field value to a parameter of a data center entity, changing an assigned field value to a parameter of a data center entity, redefining a parameter of a data center entity, deleting a parameter of a data center entity, adding a new parameter to a data center entity, and other such modifications.

The validation module 820 sends a pass/fail notification based on the results of the set of validations performed on the modified platform-independent declarative specification to the data center owner teams. When the set of validations performed on the modified platform-independent declarative specification indicate failure, the validation module 820 sends a notification of the validation failure of the failure to the owners of the data center entities, receives a newer modified platform-independent declarative specification based on receiving one or more further changes from the one or more owners of data center entities, and proceeds with performing a set of validations of the newer modified platform-independent declarative specification based on the retrieved set of predefined validation rules that is applicable to the modified platform-independent declarative specification.

When the set of validations performed on the modified platform-independent declarative specification indicates success, the validation module 820 performs a sequence of validations based on one or more simulated processes executing on the modified platform-independent declarative specification. The sequence of validations performed by the validation module 820 involves:

1. receiving a simulated platform-specific metadata representation of the data center from the simulation module 830, retrieving a set of predefined validation rules that is applicable to the simulated platform-specific metadata representation of the data center from the data store 840, and performing a set of validations of the simulated platform-specific metadata representation based on the retrieved set of predefined validation rules that is applicable to the simulated platform-specific metadata representation of the data center.

2. When the set of validations of the simulated platform-specific metadata representation results in failure, the validation module 820 sends a notification of the validation failure of the failure to the owners of the data center entities, receives a newer modified platform-independent declarative specification based on receiving one or more further changes from the one or more owners of data center entities, and proceeds with performing a set of validations of the newer modified platform-independent declarative specification based on the retrieved set of predefined validation rules that is applicable to the modified platform-independent declarative specification.

3. When the set of validations of the simulated platform-specific metadata representation results in success, the validation module 820 sends a notification of the validation success to the owners of the data center entities and to the simulation module 830. The validation module 820 may receive a simulated provisioning of cloud resources on the target cloud platform based on the simulated platform-specific metadata representation from the simulation module 830. The validation module then retrieves a set of predefined validation rules that is applicable to the simulated provisioning of cloud resources from the data store 840, and performs a set of validations of the simulated provisioning of cloud resources based on the retrieved set of predefined validation rules that is applicable to the simulated provisioning of cloud resources.

4. When the set of validations of the simulated provisioning of cloud resources results in failure, the validation module 820 sends a notification of the validation failure of the failure to the owners of the data center entities, receives a newer modified platform-independent declarative specification based on receiving one or more further changes from the one or more owners of data center entities, and proceeds with performing a set of validations of the newer modified platform-independent declarative specification based on the retrieved set of predefined validation rules that is applicable to the modified platform-independent declarative specification.

5. When the set of validations of the simulated provisioning of cloud resources results in success, the validation module 820 sends a notification of the validation success to the owners of the data center entities and to the simulation module 830. The validation module 820 may receive a simulated deployment of the data center on the target cloud platform based on the simulated provisioning of cloud resources from the simulation module 830. The validation module then retrieves a set of predefined validation rules that is applicable to the simulated deployment of the data center from the data store 840, and performs a set of validations of the simulated deployment of the data center based on the retrieved set of predefined validation rules that is applicable to the simulated deployment of the data center.

6. When the set of validations of the simulated deployment of the data center results in failure, the validation module 820 sends a notification of the validation failure of the failure to the owners of the data center entities, receives a newer modified platform-independent declarative specification based on receiving one or more further changes from the one or more owners of data center entities, and proceeds with performing a set of validations of the newer modified platform-independent declarative specification based on the retrieved set of predefined validation rules that is applicable to the modified platform-independent declarative specification.

7. When the set of validations of the simulated deployment of the data center is a success, the validation module 820 sends a notification of end-to-end validation success to the owners of the data center entities.

The simulation module 830 generates one or more simulations for the validation system 800. Thus, when the validation module 820 performs a set of validations of the modified platform-independent declarative specification and this set of validations indicates a success, the simulation module 820 may receive this indication of success, may retrieve the modified platform-independent declarative specification from the data store 840, and generate a simulated platform-specific metadata representation based on the retrieved platform-independent declarative specification. The simulation module may store the generated simulated platform-specific metadata representation in the data store 840.

When the validation module 820 performs a set of validations of the simulated platform-specific metadata representation and this set of validations indicates a success, the simulation module 830 may receive this indication of success, may retrieve the simulated platform-specific metadata representation from the data store 840, and generate a simulated provisioning of cloud resources on the target platform based on the retrieved platform-independent declarative specification. The simulation module may store the generated simulated provisioning of cloud resources in the data store 840.

When the validation module 820 performs a set of validations of the simulated provisioning of cloud resources and this set of validations indicates a success, the simulation module 830 may receive this indication of success, may retrieve the simulated provisioning of cloud resources from the data store 840, and generate a simulated deployment of the data center on the target platform based on the retrieved simulated provisioning of cloud resources. The simulation module may store the generated simulated deployment of the data center in the data store 840.

The data store 830 stores information for the validation system 800. The stored data may include the set of data center entity declarations and definitions received from entity owner teams that are generated based on the platform independent declarative specification of the data center and the target cloud platform. In some embodiments, the data store 840 may store only the most recent set of data center entity declarations as received from the data center entity owner teams. In some embodiments, the data store 830 may store each modified platform-independent declarative specification that is subsequently validated by the validation module. In some embodiments, the data store 840 may store the simulated platform-specific metadata representations, the simulated provisioned cloud resources, as well as the simulated data center deployments as generated.

In some embodiments, the data store 840 may store the set of predefined validation rules that are applicable for all the transformed metadata representations of the data center. Thus, the predefined validation rules that are stored in the data store may be predefined validation rules that are applicable to the platform-independent modified declarative specification, the simulated platform-specific metadata representation, the simulated provisioning of cloud resources, and the simulated deployed data center. Furthermore, the data store 840 may store modifications to the set of stored predefined validation rules, such as an addition of a new predefined validation rule, a deletion of an existing predefined validation rule, a modification of an existing predefined validation rule, a disabling of an existing predefined validation rule, and an enabling of an existing predefined validation rule.

The data store 840 is a memory, such as a read only memory (ROM), dynamic random-access memory (DRAM), static random-access memory (SRAM), or some combination thereof. In some embodiments, the various modules of the validation system 800 may pass various data values directly to each other. In some embodiments, the various modules of the validation system 800 may store data values in the data store 840 and retrieve data values as needed from the data store 840.

Validation Process

Figure 9:
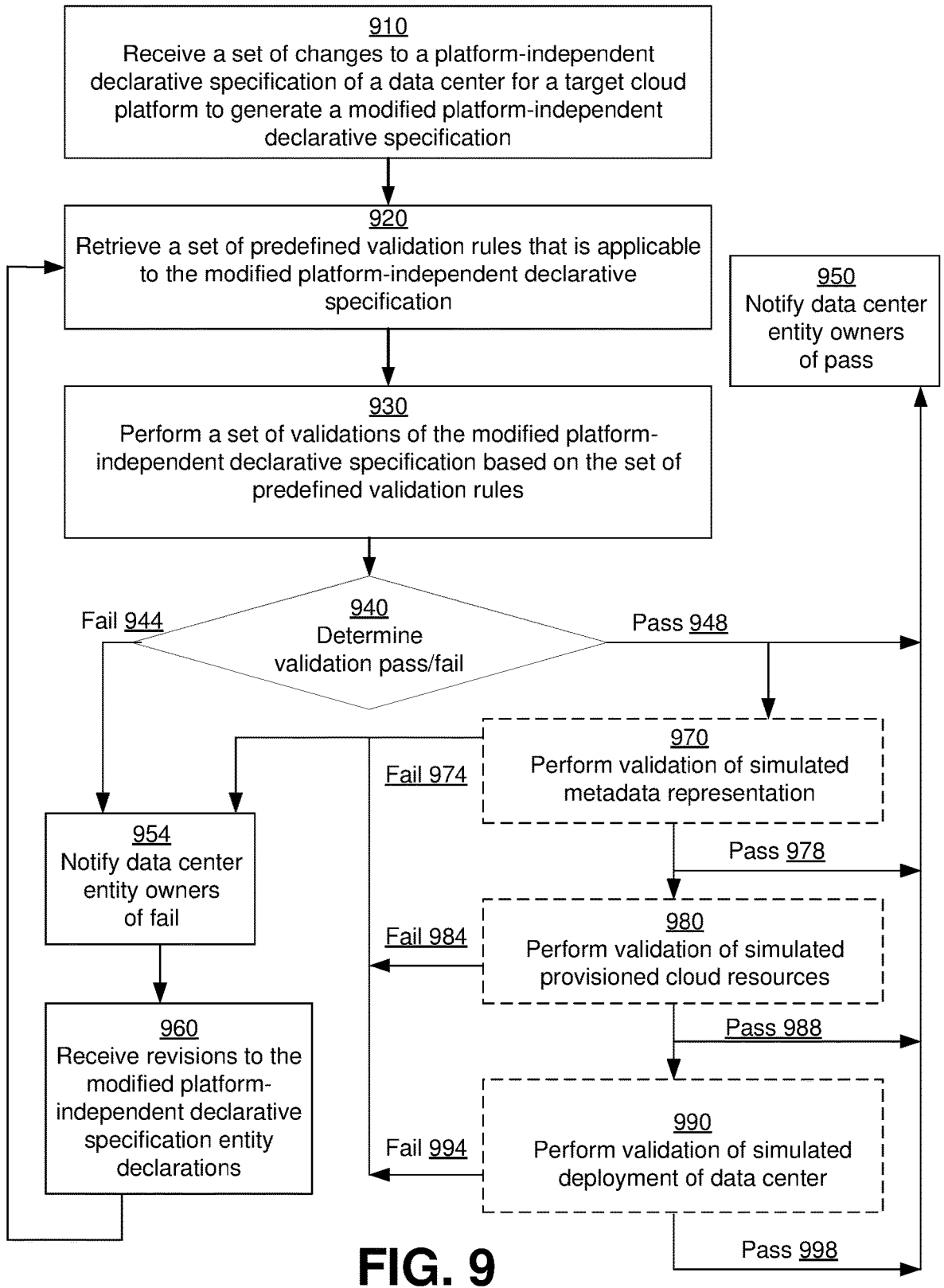
FIG. 9 is a flow chart illustrating the process for performing end-to-end validation of changes in the platform-independent declarative specification of a data center, according to one embodiment.

FIG. 9 is a flow chart illustrating the process for performing end-to-end validation of changes in the platform-independent declarative specification of a data center using the validation system 800 (shown in FIG. 8), according to one embodiment. The process illustrated herein is performed by the system 800. Various embodiments can perform the steps of FIG. 8 in different orders than those indicated herein. Moreover, other embodiments can include different and/or additional steps than the ones described herein.

The validation system 800 is configured to receive 910 a platform independent modified declarative specification of the data center that is generated from a platform-independent declarative specification and information about a target cloud platform. The platform-independent declarative specification and the information about a target cloud platform are specified by a user. The platform independent modified declarative specification of the data center is generated from changes made to the platform-independent declarative specification by data center entity owner teams. In some embodiments, the validation system 800 may retrieve the platform independent modified declarative specification from the data store 840.

The validation system 800 is configured to retrieve 920 set of predefined validation rules that are used to perform a set of validation processes. In some embodiments, the retrieved predefined validation rules may be applicable to the received platform independent modified declarative specification. In some embodiments, the validation system 800 may be configured to retrieve 920 the predefined validation rules from the data store 840.

The validation system 800 is configured to perform 930 a set of validation processes on the received platform independent modified declarative specification based on the retrieved set of predefined validation rules. The validation system 800 ensures when performing validation that any changes made to generate the platform-independent modified declarative specification conforms to the retrieved set of predefined validation rules. Examples of the changes include: assigning a field value to a parameter of a data center entity, changing an assigned field value to a parameter of a data center entity, redefining a parameter of a data center entity, deleting a parameter of a data center entity, or adding a new parameter to a data center entity in the platform-independent declarative specification.

The validation system 800 is configured to determine 940 if the set of validation processes performed by the validation system 800 on the platform-independent modified declarative specification indicate success or failure.

When the validation system 800 determines 944 that the set of validations indicate a failure of at least one of the validation processes in the set of validations, the system 800 sends 954 a notification of the fail to the corresponding data center entity owner teams. Subsequently, the validation system 800 receives 960 a newer modified platform-independent declarative specification based on revisions made to the platform-independent modified declarative specification by the data center entity owner teams. The validation system 800 re-starts the validations by retrieving 920 the set of validation rules, if not already retrieved, and proceeds with performing the set of validations of the newer modified platform-independent declarative specification.

When the validation system 800 determines 948 that the set of validations indicate a validation pass, the system 800 sends 950 a notification of the pass to the corresponding data center entity owner teams. Subsequently, the validation system 800 moves to the next stage in a sequence of validations. The sequence of validations performed by the validation system 800 involves first receiving a simulated platform-specific metadata representation of the data center and performing 970 a set of validations on this simulated platform-specific metadata representation based on a set of predefined validation rules that is applicable to this representation. When this set of validations indicate success 978, the system 800 sends 950 a notification of the pass to the corresponding data center entity owner teams. Next, the sequence of validations performed by the validation system 800 involves receiving a simulated provisioning of cloud resources based on the simulated metadata representation and performing 980 the set of validations on this simulated provisioning of cloud resources based on a set of predefined validation rules that is applicable to this simulation. When this set of validations indicate success 988, the system 800 sends 950 a notification of the pass to the corresponding data center entity owner teams. Next, the sequence of validations performed by the validation system 800 involves receiving a simulated deployment of the data center based on the simulated provisioning of the cloud resources, and performing 990 the set of validations on this simulated deployment of the data center based on a set of predefined validation rules that is applicable to this simulation. When this set of validations indicate success 998, the validation system 800 send a notification of end-to-end validation success to the data center entity owner teams, and the validation system 800 terminates.

When the set of validations performed fail at any point during the validations performed on the simulated metadata representation 974, the simulated provisioning of the cloud resources 984, or the simulated deployment of the data center 994, the validation system 800 may send a notification of the fail (Fail 974, Fail 984, Fail 994) to the corresponding data center entity owner teams. Subsequently, the validation system 800 receives 960 a newer modified platform-independent declarative specification based on revisions made to the platform-independent modified declarative specification by the data center entity owner teams. The validation system 800 re-starts by performing 930 a set of validations of the newer modified platform-independent declarative specification The processes described above can be implemented on different types of computer systems, including multi-tenant computer systems. In a multi-tenant computer system, multiple tenants share the use of a computer system, but without access or knowledge to each other's data or activities. Each tenant may be an enterprise. As an example, one tenant might be a company that employs multiple salespersons, where each salesperson uses a client device to manage their sales process. Thus, a user might maintain contact data, leads data, customer follow-up data, performance data, goals and progress data, etc., all applicable to that user's personal sales process.

Governance System

Figure 10:
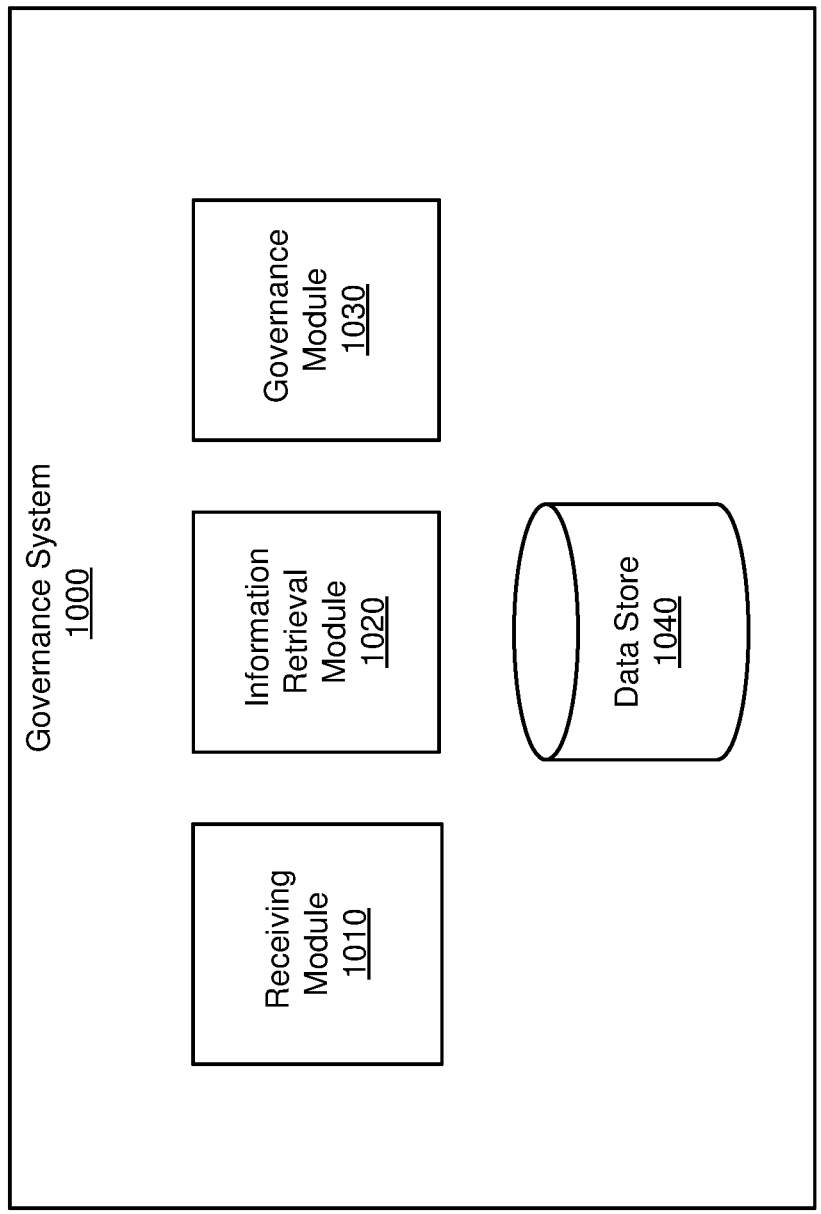
FIG. 10 is a block diagram illustrating components of a system for enforcing governance during changes in the platform-independent declarative specification of a data center, according to one embodiment.

FIG. 10 is a block diagram illustrating modules of a governance system 1000 for enforcing governance during changes in the platform-independent declarative specification of a data center, according to one embodiment.

The governance system 1000 includes a receiving module 1010, an information retrieval module 1020, a governance module 1030, and a data store 1040. Alternative configurations of the validation system 1000 may include different and/or additional modules. Functionality that is indicated as being performed by a particular module may be performed by other modules than those indicated herein. Furthermore, steps of any processes described herein can be performed in an order different from that illustrated herein.

The receiving module 1010 receives a request to modify a data center entity. The request may be for a data center entity value declared or defined in any of the platform-independent declarative specification, the modified platform-independent declarative specification, the platform-specific metadata representation, the provisioned cloud resources or the deployed data center. The data center entry may be, for example, a data center entity associated with the definitions depicted in FIG. 4. The received request may involve, for example, assigning a field value to a parameter associated with the data center entry, modifying an assigned value of a parameter, modifying parameters, or deleting one or more parameters themselves. The receiving system 1010 also receives approval of the request to modify the data center entry from a second entity.

The information retrieval module 1020 retrieves a set of owners who belong to the data center entity owner teams that are associated with the data center entity for which the request is received. The retrieved set of owners may be a set of developers who are associated with generating and modifying the data center entry or may be global administrators who have root access to all the data center entities. The retrieved set of owners associated with a received request may be stored in the data store 1040.

The governance module 1030 determines if the second entity who is providing the approval is in the retrieved set of owners associated with the data center entry. In response to determining that the second user is in the retrieved set of owners associated with the data center entry, the governance module 1030 permits the modification of the data center entry based on the received request. In response to determining that the second user is not in the retrieved set of owners associated with the data center entry, the governance module 1030 denies modification of the data center entry based on the received request.

The data store 1040 stores information for the governance system 1000. The stored data may include the set of owners associated with each data center entry. The data store 1040 is a memory, such as a read only memory (ROM), dynamic random-access memory (DRAM), static random-access memory (SRAM), or some combination thereof. In some embodiments, the various modules of the governance system 1000 may pass various data values directly to each other. In some embodiments, the various modules of the governance system 1000 may store data values in the data store 1040 and retrieve data values as needed from the data store 1040.

Computer Architecture

Figure 11:
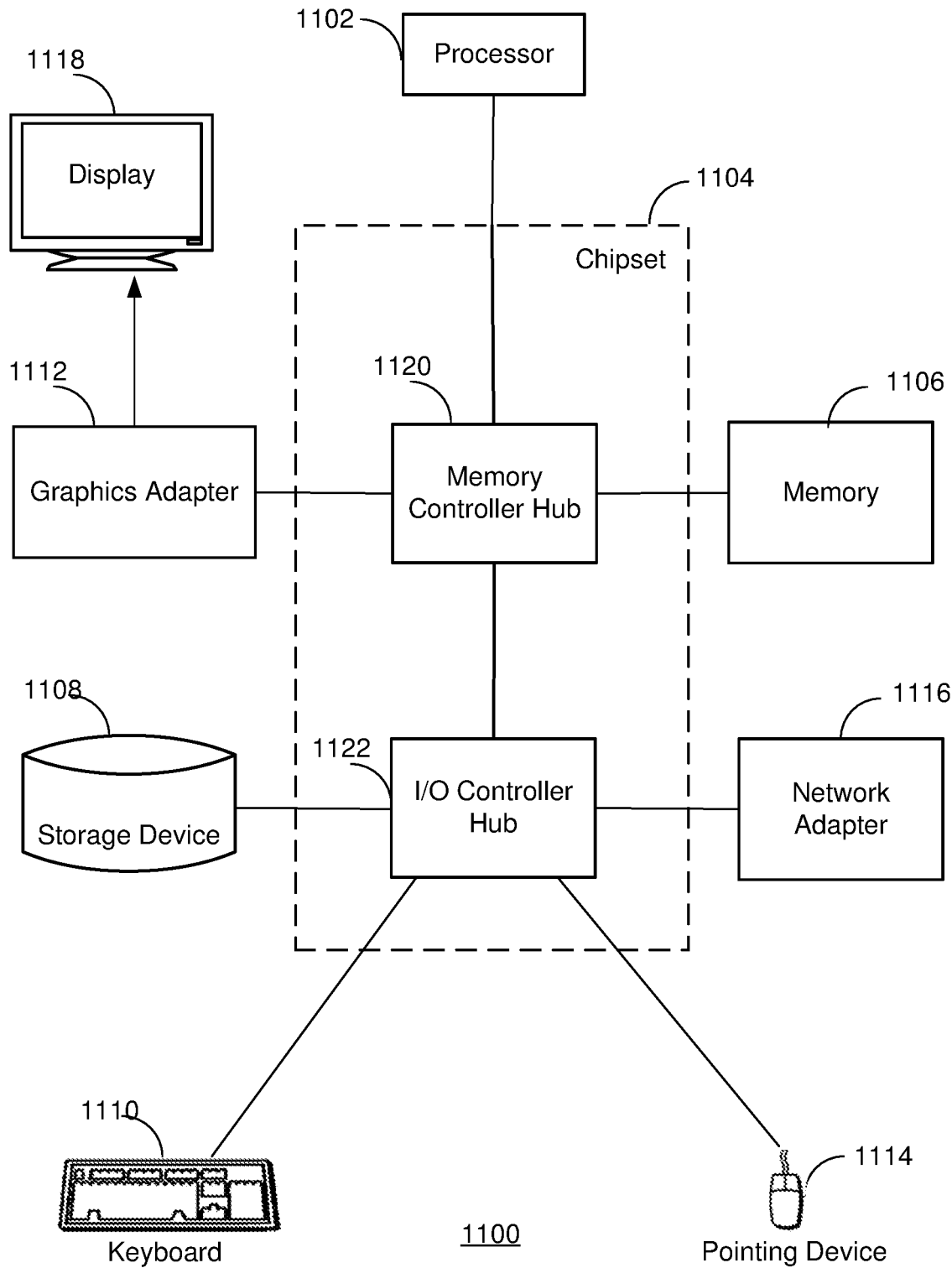
FIG. 11 is a block diagram illustrating the architecture of a typical computer system for use in the environment of FIG. 8 and FIG. 10 according to one embodiment.

FIG. 11 is a block diagram illustrating the architecture of a typical computer system 1100 for use in the systems of FIG. 8 and FIG. 10 according to one embodiment. Illustrated are at least one processor 1102 coupled to a chipset 1104. Also coupled to the chipset 1104 are a memory 1106, a storage device 1108, a keyboard 1110, a graphics adapter 1112, a pointing device 1114, and a network adapter 1116. A display 1118 is coupled to the graphics adapter 1112. In one embodiment, the functionality of the chipset 1104 is provided by a memory controller hub 1120 and an I/O controller hub 1122. In another embodiment, the memory 1106 is coupled directly to the processor 1102 instead of the chipset 1104.

The storage device 1108 is a non-transitory computer-readable storage medium, such as a hard drive, compact disk read-only memory (CD-ROM), DVD, or a solid-state memory device. The memory 1106 holds instructions and data used by the processor 1102. The pointing device 1114 may be a mouse, track ball, or other type of pointing device, and is used in combination with the keyboard 1110 to input data into the computer system 1100. The graphics adapter 1112 displays images and other information on the display 1118. The network adapter 1116 couples the computer system 1100 to a network.

As is known in the art, a computer system 1100 can have different and/or other components than those shown in FIG. 11. In addition, the computer system 1100 can lack certain illustrated components. For example, a computer system 1100 acting as an online system 800 or 1000 may lack a keyboard 1110 and a pointing device 1114. Moreover, the storage device 1108 can be local and/or remote from the computer 1100 (such as embodied within a storage area network (SAN)).

The computer system 1100 is adapted to execute computer modules for providing the functionality described herein. As used herein, the term "module" refers to computer program instruction and other logic for providing a specified functionality. A module can be implemented in hardware, firmware, and/or software. A module can include one or more processes, and/or be provided by only part of a process. A module is typically stored on the storage device 1108, loaded into the memory 1106, and executed by the processor 1102.

The types of computer systems 1100 used by the system of FIGS. 8 and 10 can vary depending upon the embodiment and the processing power used by the entity. For example, a client device may be a mobile phone with limited processing power, a small display 1118, and may lack a pointing device 1114. The online systems 800 and 1000 in contrast, may comprise multiple blade servers working together to provide the functionality described herein.

ADDITIONAL CONSIDERATIONS

The particular naming of the components, capitalization of terms, the attributes, data structures, or any other programming or structural aspect is not mandatory or significant, and the mechanisms that implement the embodiments described may have different names, formats, or protocols. Further, the systems may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

Some portions of above description present features in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain embodiments described herein include process steps and instructions described in the form of an algorithm. It should be noted that the process steps and instructions of the embodiments could be embodied in software, firmware or hardware, and when embodied in software, could be downloaded to reside on and be operated from different platforms used by real-time network operating systems.

The embodiments described also relate to apparatuses for performing the operations herein. An apparatus may be specially constructed for the required purposes, or it may comprise a general-purpose computer selectively activated or reconfigured by a computer program stored on a computer readable medium that can be accessed by the computer. Such a computer program may be stored in a non-transitory computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the art, along with equivalent variations. In addition, the present embodiments are not described with reference to any particular programming language. It is appreciated that a variety of programming languages may be used to implement the teachings of the embodiments as described herein.

The embodiments are well suited for a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes and may not have been selected to delineate or circumscribe the inventive subject matter. Accordingly, the disclosure of the embodiments is intended to be illustrative, but not limiting.

We claim:

1. A computer-implemented method for performing end-to-end validation of transformations of one or more changes to a declarative specification of a data center that is configured for deployment on a target cloud computing platform, the method comprising:
   receiving a platform-independent declarative specification of the data center and an identification of the target cloud platform from a user;
   receiving a modified platform-independent declarative specification based on one or more changes to the platform-independent declarative specification from one or more owners of data center entities; and
   performing end-to-end validation of the modified platform-independent declarative specification by:
      retrieving a set of predefined validation rules that is applicable to the modified platform-independent declarative specification;
      performing a set of validations of the modified platform-independent declarative specification based on the retrieved set of predefined validation rules that is applicable to the modified platform-independent declarative specification; and
      in response to the performed set of validations of the modified platform-independent declarative specification indicating a success:
         sending a notification of the success to the one or more owners of the data center entities;
         performing a sequence of validations based on one or more simulated processes executing on the modified platform-independent declarative specification; and
         in response to the performed sequence of validations indicating success,
            sending a notification of end-to-end validation success in association with the received one or more changes to the platform-independent declarative specification to the one or more owners of the data center entities.

2. The computer-implemented method of claim 1, further comprising:
   in response to an indication of failure of any particular performed validation from either the performed set of validations or the performed sequence of validation,
      sending a notification of the validation failure of the particular performed validation to the one or more owners of the data center entities;
      receiving a newer modified platform-independent declarative specification based on receiving one or more further changes from the one or more owners of data center entities; and
      proceeding with performing a set of validations of the newer modified platform-independent declarative specification based on the retrieved set of predefined validation rules that is applicable to the modified platform-independent declarative specification.

3. The computer-implemented method of claim 1, wherein performing the sequence of validations based on the one or more simulated processes executing on the modified declarative specification further comprises:
   simulating compilation of the modified platform-independent declarative specification to generate a simulated platform-specific metadata representation of the data center;
   retrieving a set of predefined validation rules that is applicable to the simulated platform-specific metadata representation of the data center;
   performing a set of validations of the simulated platform-specific metadata representation based on the retrieved set of predefined validation rules that is applicable to the simulated platform-specific metadata representation of the data center; and
   in response to the performed set of validations of the simulated platform-specific metadata representation indicating success, sending a notification of the success to the one or more owners of the data center entities.

4. The computer-implemented method of claim 3, wherein performing the sequence of validations based on the one or more simulated processes executing on the modified platform-independent declarative specification further comprises:
   in response to the performed set of validations of the simulated platform-specific metadata representation indicating success:
      simulating provisioning of cloud resources based on the simulated platform-specific metadata representation to generate a simulated provisioning of the cloud resources;
      retrieving a set of predefined validation rules that is applicable to the simulated provisioning of the cloud resources;
      performing a set of validations of the simulated provisioning of the cloud resources based on the retrieved set of predefined validation rules that is applicable to the simulated provisioning of the cloud resources; and
      in response to the performed set of validations of the simulated provisioning of the cloud resources indicating success, sending a notification of the success to the one or more owners of the data center entities.

5. The computer-implemented method of claim 4, wherein performing the sequence of validations based on the one or more simulated processes executing on the modified platform-independent declarative specification further comprises:
   in response to the performed set of validations of the simulated provisioning of the cloud resources indicating success:
      simulating deployment of the data center based on the simulated provisioning of the cloud resources to generate a simulated deployment of the data center;
      retrieving a set of predefined validation rules that is applicable to the simulated deployment of the data center;
      performing a set of validations of the simulated deployment of the data center based on the retrieved set of predefined validation rules that is applicable to the simulated deployment of the data center; and
      in response to the performed set of validations of the simulated deployment of the data center indicating success,
         generating the notification of end-to-end validation success in association with the received one or more changes to the declarative specification.

6. The computer-implemented method of claim 5, further comprising:
   receiving, from an owner of the one or more owners of the data center entities, a modification of the retrieved set of predefined validation rules that is applicable to any of: the modified platform-independent declarative specification, the simulated platform-specific metadata representation, the simulated provisioning of cloud resources, and the simulated deployment of the data center; from an owner of the one or more owners of the data center entities, the modification comprising at least one of:
      an addition of a new predefined validation rule;
      a deletion of an existing predefined validation rule;
      a modification of an existing predefined validation rule;
      a disabling of an existing predefined validation rule; and
      an enabling of an existing predefined validation rule.

7. The computer-implemented method of claim 1, wherein receiving one or more changes to the platform-independent declarative specification from the one or more owners of data center entities to generate the modified platform-independent declarative specification comprises at least one of: assigning one or more field values to one or more parameters of a data center entity and changing one or more of assigned field values to one or more parameters of a data center entity in the platform-independent declarative specification.

8. The computer-implemented method of claim 7, wherein performing the set of validations of the modified platform-independent declarative specification comprises checking that the field values to the one or more parameters of the data center entity in the modified platform-independent declarative specification is based on the retrieved set of predefined validation rules that is applicable to the modified platform-independent declarative specification.

9. The computer-implemented method of claim 1, wherein receiving one or more changes to the platform-independent declarative specification from the one or more owners of data center entities to generate the modified platform-independent declarative specification comprises at least one of: redefining one or more parameters of a data center entity, deleting one or more parameters of a data center entity in the platform-independent declarative specification, and adding one or more parameters to the data center entity.

10. The computer-implemented method of claim 9, wherein performing the set of validations of the modified platform-independent declarative specification comprises checking that the one or more parameters of the data center entity in the modified platform-independent declarative specification is based on the retrieved set of predefined validation rules that is applicable to the modified platform-independent declarative specification.

11. The computer-implemented method of claim 1, wherein the platform independent declarative specification of the data center comprises a hierarchy of data center entities, wherein a data center entity is associated with a team, the method further comprising:
   receiving a request from a first user to modify a data center entity;
   receiving approval of the request to modify the data center entity from a second user;

determining a set of predefined owners associated with the data center entity based on the team associated with the data center entity;

in response to determining that the second user is in the retrieved set of predefined owners associated with the data center entity, permitting modification of the data center entity based on the received request; and in response to determining that the second user is not in the retrieved set of predefined owners associated with the data center entity, denying modification of the data center entity based on the received request.

12. The computer-implemented method of claim 11, wherein receiving the request from the first user to modify the data center entity comprises receiving the request to perform at least one of:

assigning one or more field values to one or more parameters of the data center entity;

changing one or more of assigned field values to one or more parameters of the data center entity;

redefining one or more parameters of the data center entity;

deleting one or more parameters of the data center entity; and adding one or more parameters to the data center entity.

13. A non-transitory computer readable storage medium for storing instructions that when executed by a computer processor cause the computer processor to perform steps comprising:

receiving a platform-independent declarative specification of a data center and an identification of a target cloud platform from a user;

receiving one or more changes to the platform-independent declarative specification from one or more owners of data center entities to generate a modified platform-independent declarative specification; and performing end-to-end validation of the modified platform-independent declarative specification by:

retrieving a set of predefined validation rules that is applicable to the modified platform-independent declarative specification;

performing a set of validations of the modified platform-independent declarative specification based on the retrieved set of predefined validation rules that is applicable to the modified platform-independent declarative specification; and in response to the performed set of validations of the modified platform-independent declarative specification indicating a success:

sending a notification of the success to the one or more owners of the data center entities;

performing a sequence of validations based on one or more simulated processes executing on the modified platform-independent declarative specification; and in response to the performed sequence of validations indicating success, sending a notification of end-to-end validation success in association with the received one or more changes to the platform-independent declarative specification to the one or more owners of the data center entities.

14. The computer readable storage medium of claim 13, the steps further comprising:

in response to an indication of failure of a particular performed validation from either the performed set of validations or the performed sequence of validation, sending a notification of the validation failure of the particular performed validation to the one or more owners of the data center entities;

receiving a newer modified platform-independent declarative specification based on receiving one or more further changes from the one or more owners of data center entities; and proceeding with performing a set of validations of the newer modified platform-independent declarative specification based on the retrieved set of predefined validation rules that is applicable to the modified platform-independent declarative specification.

15. The computer readable storage medium of claim 13, wherein performing the sequence of validations based on the one or more simulated processes executing on the modified declarative specification further comprises:

simulating compilation of the modified platform-independent declarative specification to generate a simulated platform-specific metadata representation of the data center;

retrieving a set of predefined validation rules that is applicable to the simulated platform-specific metadata representation of the data center;

performing a set of validations of the simulated platform-specific metadata representation based on the retrieved set of predefined validation rules that is applicable to the simulated platform-specific metadata representation of the data center; and in response to the performed set of validations of the simulated platform-specific metadata representation indicating success, sending a notification of the success to the one or more owners of the data center entities.

16. The computer readable storage medium of claim 15, wherein performing the sequence of validations based on the one or more simulated processes executing on the modified platform-independent declarative specification further comprises:

in response to the performed set of validations of the simulated platform-specific metadata representation indicating success:

simulating provisioning of cloud resources based on the simulated platform-specific metadata representation to generate a simulated provisioning of the cloud resources;

retrieving a set of predefined validation rules that is applicable to the simulated provisioning of the cloud resources;

performing a set of validations of the simulated provisioning of the cloud resources based on the retrieved set of predefined validation rules that is applicable to the simulated provisioning of the cloud resources; and in response to the performed set of validations of the simulated provisioning of the cloud resources indicating success, sending a notification of the success to the one or more owners of the data center entities.

17. The computer readable storage medium of claim 16, wherein performing the sequence of validations based on the one or more simulated processes executing on the modified platform-independent declarative specification further comprises:

in response to the performed set of validations of the simulated provisioning of the cloud resources indicating success:

simulating deployment of the data center based on the simulated provisioning of the cloud resources to generate a simulated deployment of the data center;

retrieving a set of predefined validation rules that is applicable to the simulated deployment of the data center;

performing a set of validations of the simulated deployment of the data center based on the retrieved set of predefined validation rules that is applicable to the simulated deployment of the data center; and in response to the performed set of validations of the simulated deployment of the data center indicating success, generating the notification of end-to-end validation success in association with the received one or more changes to the declarative specification.

18. The computer readable storage medium of claim 17, the steps further comprising:

receiving, from an owner of the one or more owners of the data center entities, a modification of the retrieved set of predefined validation rules that is applicable to any of: the modified platform-independent declarative specification, the simulated platform-specific metadata representation, the simulated provisioning of cloud resources, and the simulated deployment of the data center; from an owner of the one or more owners of the data center entities, the modification comprising at least one of:

an addition of a new predefined validation rule;
a deletion of an existing predefined validation rule;
a modification of an existing predefined validation rule;
a disabling of an existing predefined validation rule; and
an enabling of an existing predefined validation rule.

19. The computer readable storage medium of claim 13, wherein the platform-independent declarative specification of the data center comprises a hierarchy of data center entities, wherein a data center entity is associated with a team, the steps further comprising:

receiving a request from a first user to modify a data center entity;
receiving approval of the request to modify the data center entity from a second user;
determining a set of predefined owners associated with the data center entity based on the team associated with the data center entity;
in response to determining that the second user is in the retrieved set of predefined owners associated with the data center entity, permitting modification of the data center entity based on the received request; and
in response to determining that the second user is not in the retrieved set of predefined owners associated with the data center entity, denying modification of the data center entity based on the received request.

20. A computer system comprising:

a computer processor; and a non-transitory computer readable storage medium for storing instructions that when executed by a computer processor cause the computer processor to perform steps for performing predictions, the steps comprising:

receiving a platform-independent declarative specification of a data center from a user;

receiving information identifying a target cloud platform for deploying a data center based on the platform-independent declarative specification;

receiving one or more changes to the platform-independent declarative specification from one or more owners of data center entities to generate a modified platform-independent declarative specification; and performing end-to-end validation of the modified platform-independent declarative specification by:

retrieving a set of predefined validation rules that is applicable to the modified platform-independent declarative specification;

performing a set of validations of the modified platform-independent declarative specification based on the retrieved set of predefined validation rules that is applicable to the modified platform-independent declarative specification; and in response to the performed set of validations of the modified platform-independent declarative specification indicating a success:

sending a notification of the success to the one or more owners of the data center entities;

performing a sequence of validations based on one or more simulated processes executing on the modified platform-independent declarative specification; and in response to the performed sequence of validations indicating success, sending a notification of end-to-end validation success in association with the received one or more changes to the platform-independent declarative specification to the one or more owners of the data center entities.

* * * * *